(12) United States Patent
Andronescu et al.

(10) Patent No.: US 12,137,837 B2
(45) Date of Patent: Nov. 12, 2024

(54) SYSTEMS AND METHODS FOR REAL-TIME MONITORING OF BOILING FLUID FOR FOOD PROCESSING ASSISTANCE

(71) Applicant: Samsung Electronics Company, Ltd., Suwon si (KR)

(72) Inventors: Tiberiu A. Andronescu, Ontario (CA); Philipp Schoessler, Scotts Valley, CA (US); Brian Harms, San Jose, CA (US); Megan Rowe, San Jose, CA (US); Jun Yeon Cho, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 17/581,688

(22) Filed: Jan. 21, 2022

(65) Prior Publication Data
US 2023/0233019 A1  Jul. 27, 2023

(51) Int. Cl.
*A47J 27/56* (2006.01)
*A23L 5/10* (2016.01)
(Continued)

(52) U.S. Cl.
CPC ............... *A47J 36/32* (2013.01); *A23L 5/13* (2016.08); *A47J 27/21091* (2013.01);
(Continued)

(58) Field of Classification Search
CPC . A47J 36/32; A47J 27/21058–27/21158; A47J 27/56–27/64; A47J 31/545;
(Continued)

(56) References Cited

U.S. PATENT DOCUMENTS

| 4,665,292 A | * | 5/1987 | Payne | G05D 23/24 |
| | | | | 219/448.12 |
| 5,947,370 A | * | 9/1999 | Rona | G01N 25/08 |
| | | | | 236/78 D |

(Continued)

FOREIGN PATENT DOCUMENTS

CN  109708158 A  5/2019

OTHER PUBLICATIONS

Bennet Cobley, "Student Innovation—OnionBot: Building a Robot Sous-Chef," Design Spark, "https://www.rs-online.com/designspark/student-innovation-onionbot-building-a-robot-sous-chef," 10 pages.

(Continued)

*Primary Examiner* — Drew E Becker

(57) ABSTRACT

In one embodiment, a method for monitoring for boiling fluid in a kitchen environment by a smart hood apparatus includes accessing sensor data indicating one or more parameters of a cooking utensil detected by the smart hood apparatus from sensors associated with the smart hood apparatus, wherein the sensors comprise one or more of a camera, a thermal sensor, or an audio sensor, and wherein the cooking utensil contains fluid, determining information associated with boiling events associated with the fluid in the cooking utensil based on the sensor data by algorithms, wherein the information comprises at least a boiling time required for the fluid to boil, and sending instructions for presenting a notification comprising the information associated with the boiling events.

20 Claims, 32 Drawing Sheets

(51) Int. Cl.
  *A47J 27/21* (2006.01)
  *A47J 31/54* (2006.01)
  *A47J 36/32* (2006.01)
  *F24C 15/20* (2006.01)
(52) U.S. Cl.
  CPC ......... *A47J 27/21158* (2013.01); *A47J 27/56* (2013.01); *A47J 31/545* (2013.01); *F24C 15/2021* (2013.01); *A23V 2002/00* (2013.01)
(58) Field of Classification Search
  CPC ........ A23L 5/13; F24C 15/2021; F24C 7/083; F24C 3/12–3/128; F24C 7/08–7/088; F24C 15/20–15/2092
  See application file for complete search history.

(56) References Cited

U.S. PATENT DOCUMENTS

| | | | | |
|---|---|---|---|---|
| 6,384,384 | B1* | 5/2002 | Connolly | H05B 3/746 219/452.11 |
| 8,530,842 | B2* | 9/2013 | Has | F24C 7/083 250/339.04 |
| 2004/0145466 | A1* | 7/2004 | Anthony | G08B 17/107 340/584 |
| 2011/0253693 | A1* | 10/2011 | Lyons | A47J 27/00 219/209 |
| 2012/0111852 | A1* | 5/2012 | Bach | H05B 1/0266 219/448.11 |
| 2013/0175254 | A1* | 7/2013 | Bach | H05B 3/746 219/447.1 |
| 2015/0260193 | A1* | 9/2015 | Armstrong | F24C 15/20 415/1 |
| 2015/0286891 | A1* | 10/2015 | Guan | F24C 7/083 382/168 |
| 2016/0169744 | A1* | 6/2016 | Apaydin | F24C 3/126 250/338.1 |
| 2017/0367151 | A1* | 12/2017 | Rafii | H05B 6/1218 |
| 2018/0116437 | A1* | 5/2018 | Armstrong | A47J 36/321 |
| 2018/0275110 | A1* | 9/2018 | Rafii | G06T 1/0007 |
| 2020/0292392 | A1* | 9/2020 | Hooker | G01J 5/52 |
| 2020/0363778 | A1 | 11/2020 | Mahapatra | |
| 2020/0367692 | A1* | 11/2020 | Stipe | G06V 20/52 |
| 2023/0213200 | A1* | 7/2023 | Luis Alonso | F24C 3/008 126/39 R |
| 2023/0235893 | A1* | 7/2023 | Santos | G05B 15/02 700/276 |
| 2023/0245543 | A1* | 8/2023 | Andronescu | G06V 10/56 |
| 2023/0314002 | A1* | 10/2023 | Heckmann | F24C 15/2021 219/446.1 |
| 2023/0341129 | A1* | 10/2023 | Taylor | F24C 7/082 |
| 2023/0375292 | A1* | 11/2023 | Won | G06V 20/60 |
| 2023/0383955 | A1* | 11/2023 | Taylor | F24C 7/083 |

OTHER PUBLICATIONS

Miso Robotics, "Miso Robotics Announces CookRight Software as a Standalone Offering to Increase Accuracy in Kitchens," Newsroom Press Release, https://misorobotics.com/newsroom/miso-robotics-announces-cookright-software-as-a-standalone-offering-to-increase-accuracy-in-kitchens/; Miso Robotics; 8 pgs.

Cooksy, "Our Story," https://www.facebook.com/cooksyofficial/, (https://www.instagram.com/cooksyofficial/), (https://www.youtube.com/channel/UCByFhkL_IKDU2-exqWK7UKQ), 3 pgs.

Tabacci et al., "A statistical pattern recognition approach for the classification of cooking stages. The boiling water case;" vol. 74, Issue 8, Aug. 2013, https://www.sciencedirect.com/science/article/abs/pii/S0003682X1300042X; pp. 1022-1032.

* cited by examiner

Detected Pot Outline 410

Detected Pot Outline 420

Circular mask of pot contents 510

Illustration Of Bubble Circles Being Detected
During A Water Boiling Event
710

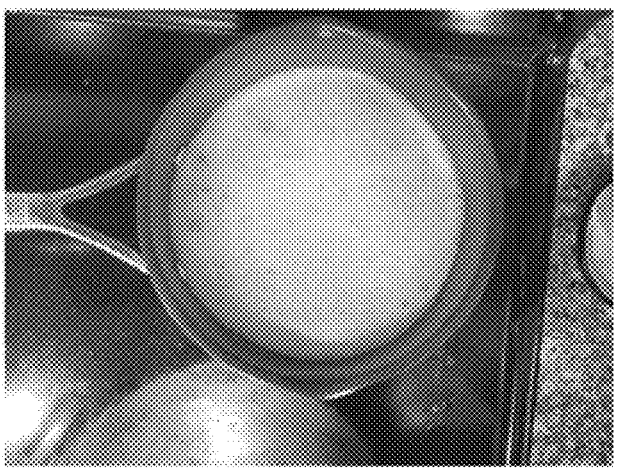
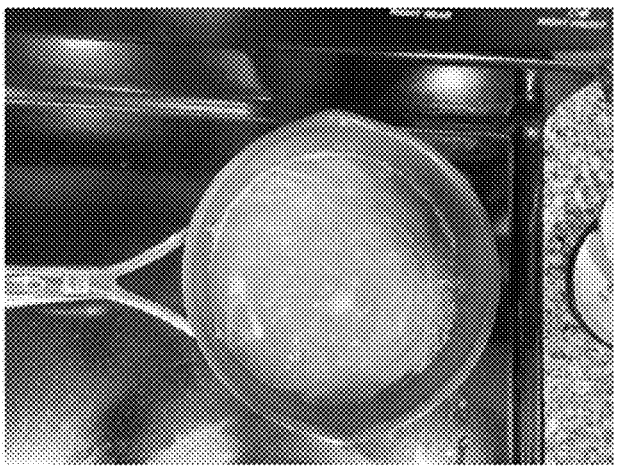
FIG. 18

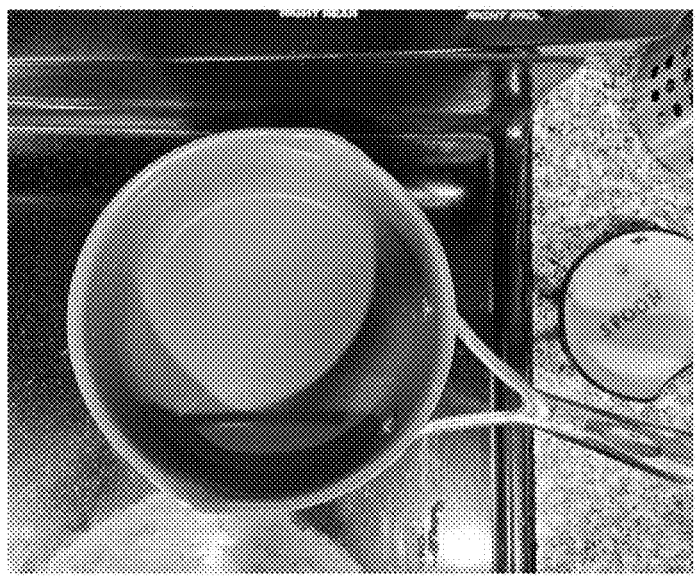
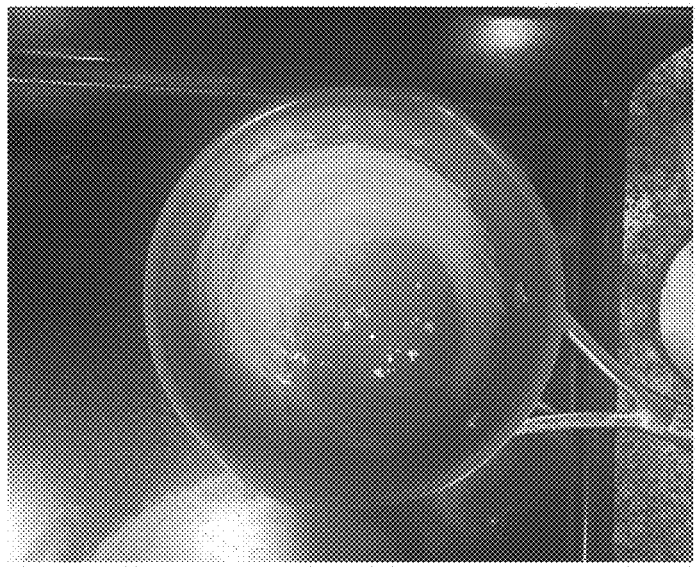
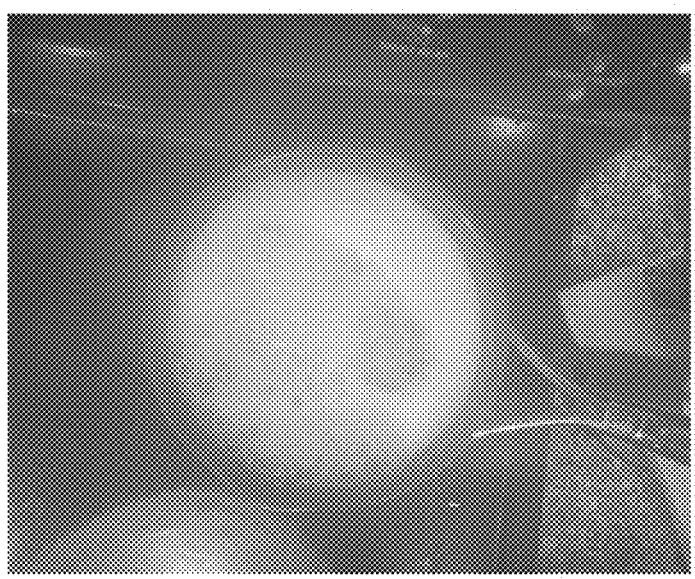
*FIG. 28*

2900

2910 — Access, from one or more sensors associated with a smart hood apparatus, sensor data indicating one or more parameters of a cooking utensil detected by the smart hood apparatus, wherein the one or more sensors comprise one or more of a camera, a thermal sensor, or an audio sensor, wherein the cooking utensil contains fluid, wherein the smart hood apparatus is integrated in a kitchen hood in a kitchen environment, wherein the kitchen hood is positioned over a cooktop, wherein the cooking utensil is placed on the cooktop, and wherein the one or more parameters of the cooking utensil comprise one or more of a material of the cooking utensil, a position of the cooking utensil on the cooktop, a temperature of the cooking utensil, a size of the cooking utensil, a volume of the cooking utensil, an area of the cooking utensil occupying the cooktop, a depth of the cooking utensil, a depth of the fluid in the cooking utensil, a type of the fluid in the cooking utensil, a decibel associated with the cooking utensil, or a lid associated with the cooking utensil 2920 — Determine, based on the sensor data by one or more algorithms, information associated with one or more boiling events associated with the fluid in the cooking utensil, wherein the information comprises at least a boiling time required for the fluid to boil, wherein determining the information associated with the one or more boiling events comprises determining a mean temperature of the fluid in the cooking utensil, wherein the information associated with the one or more boiling events is based on the mean temperature, wherein the one or more boiling events comprise one or more of a non-boil, an imminent boil, an active boil, an imminent over-boil, or an active over-boil of the fluid in the cooking utensil, wherein determining the information associated with the one or more boiling events when the one or more boiling events comprise at least an active boil of the fluid in the cooking utensil comprises detecting bubble circles in the fluid in the cooking utensil, determining a number of bubble circles per surface area of the fluid in the cooking utensil is greater than a threshold number, and determining the fluid in the cooking utensil is in an active boil responsive to determining the number of bubble circles per surface area of the fluid in the cooking utensil is greater than the threshold number, and wherein determining the information associated with the one or more boiling events when the one or more boiling events comprise at least an active over-boil of the fluid in the cooking utensil comprises detecting a utensil outline of the cooking utensil, determining an over-boil region associated with the cooking utensil based on the utensil outline, detecting the fluid appearing in the over-boil region associated with the cooking utensil, and determining the fluid in the cooking utensil is in an active over-boil based on the detection of the fluid appearing in the over-boil region 2929 — Send instructions for presenting a notification comprising the information associated with the one or more boiling events

*FIG. 29*

SYSTEMS AND METHODS FOR REAL-TIME MONITORING OF BOILING FLUID FOR FOOD PROCESSING ASSISTANCE

TECHNICAL FIELD

This disclosure relates generally to food processing assistance within kitchen environments, and in particular relates to real-time monitoring of boiling fluid.

BACKGROUND

Our homes are increasingly trending towards a smart environment. One area of the smart home that has gained momentum recently is the smart kitchen environment. The kitchen is a very important room in any house. It is at the center of a family's day-to-day life and serves as a common gathering place for people to socialize, eat and cook together. With the goal of smart kitchen, a variety of products such as a smart oven, smart stove top and smart range hood have emerged on the market. These products serve more as a gateway to a fully integrated kitchen accessible from a user's personal computer or smartphone.

BRIEF DESCRIPTION OF THE DRAWINGS

FIG. 15 illustrates an example setting with lid on.

FIG. 16A illustrates an example flow diagram for offline generation of a model that detects boiling in a pot with lid on.

FIG. 16B illustrates an example flow diagram of real-time estimation of time to boil.

FIG. 18 illustrates example images of different classes of boiling events.

FIG. 28 illustrates example detection results of over-boil with confidence scores.

FIG. 29 illustrates is a flow diagram of a method for monitoring for boiling fluid in a kitchen environment, in accordance with the presently disclosed embodiments.

DESCRIPTION OF EXAMPLE EMBODIMENTS

Figure 1:
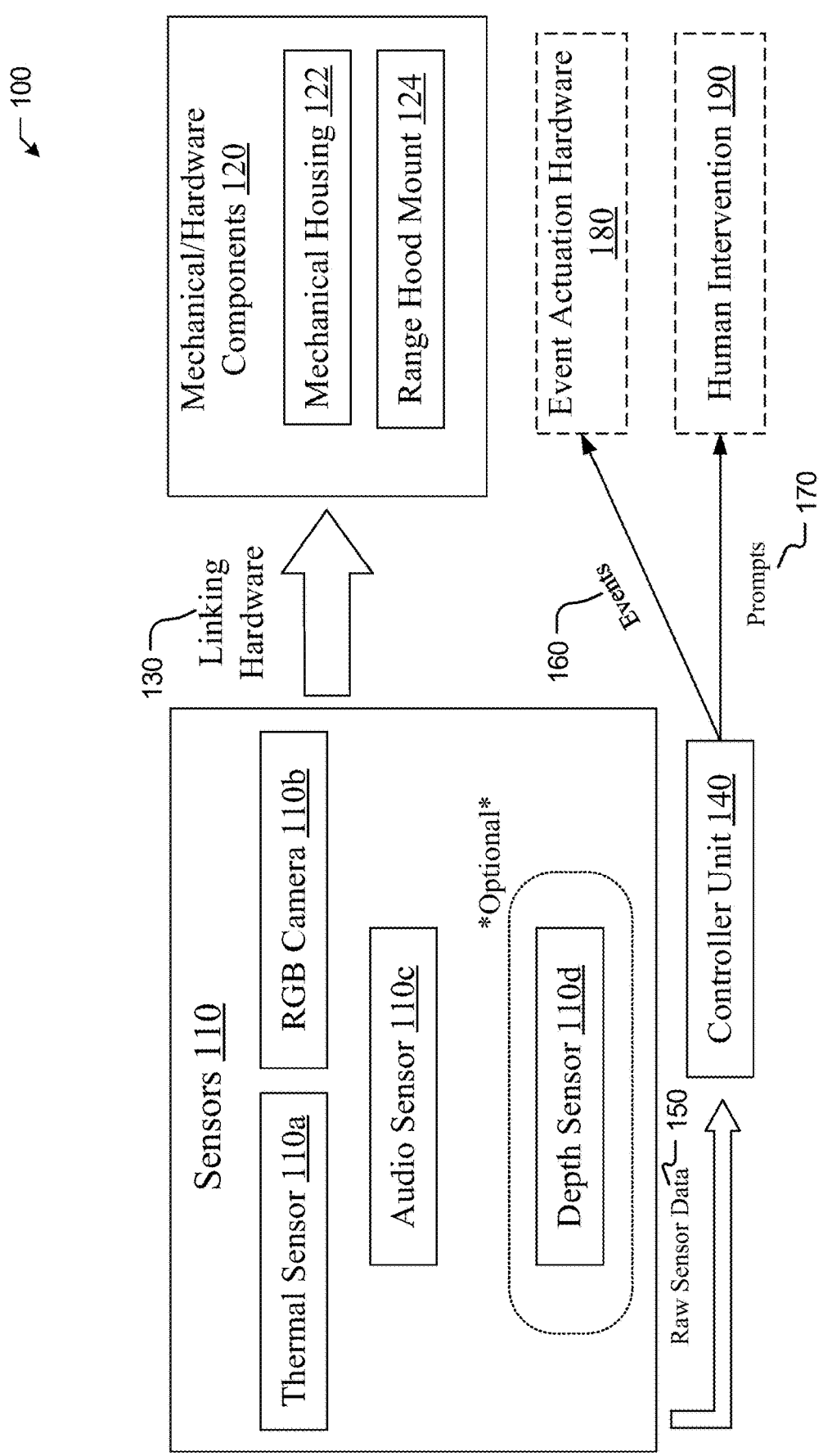
FIG. 1 illustrates an example architecture of a smart hood apparatus.

Real-Time Monitoring of Boiling Fluid for Food Processing Assistance

In particular embodiments, a smart hood apparatus may pertain to a stand-alone sensor apparatus unit. As an example and not by way of limitation, it may be mounted to an existing range hood in the kitchen. The apparatus unit may include, but not limited to, the following sensors: a temperature sensing unit, an RGB camera and an audio sensor. The sensors may be oriented to capture the activity on the entire cooktop/stovetop and relay this information to a controller device. The field of view (FOV) may be achieved individually by each sensor, or by merging the information from multiple sensors. The controller device may run algorithms using such information to provide a variety of assisting capabilities for a user cooking on the cooktop/stovetop. In particular embodiments, the smart hood apparatus may leverage sensor fusion, computer vision and sensor related technologies to make informed decisions for monitoring of boiling fluid, which may result in a technical advantage of improved overall cooking experience for the user. As an example and not by way of limitation, the features of the smart hood apparatus may include, but not limited to, boil time prediction, boil detection, over-boil prevention and over-boil detection. Although this disclosure describes particular apparatus for with particular cooking assistances in a particular manner, this disclosure contemplates any suitable apparatus for any suitable cooking assistance in any suitable manner.

In particular embodiments, for monitoring for boiling fluid in a kitchen environment, the smart hood apparatus may access, from one or more sensors associated with the smart hood apparatus, sensor data indicating one or more parameters of a cooking utensil (e.g., a pot or a pan) detected by the smart hood apparatus. As an example and not by way of limitation, the one or more sensors may comprise one or more of a camera, a thermal sensor, or an audio sensor, and wherein the cooking utensil contains fluid. The smart hood apparatus may then determine, based on the sensor data by one or more algorithms (e.g., machine-learning models), information associated with one or more boiling events associated with the fluid in the cooking utensil. In particular embodiments, the information may comprise at least a boiling time required for the fluid to boil. The smart hood apparatus may further send instructions for presenting a notification comprising the information associated with the one or more boiling events.

Certain technical challenges exist for monitoring for boiling fluid in a kitchen environment. One technical challenge may include accurately estimating boiling time. The solution presented by the embodiments disclosed herein to address this challenge may be a machine-learning model trained on various features associated with the cooking utensil and fluid in it as these features may provide comprehensive information about the boiling task to enable the model make a reliable estimation. Another technical challenge may include effective detection of active boiling. The solution presented by the embodiments disclosed herein to address this challenge may be detecting active boiling based on detection of bubble circles exceeding a threshold as bubble circles are intuitively correlated to active boiling. Another technical challenge may include effective detection of active boiling when there is a lid on the cooking utensil. The solution presented by the embodiments disclosed herein to address this challenge may be detecting active boiling based on audio features as intuitively the boiling process may be distinguished with the human ear, meaning it may be possible to monitor boiling process algorithmically based on audio features as well. Another technical challenge may include effective detection of over-boil. One solution presented by the embodiments disclosed herein to address this challenge may be an over-boil detection model based on a convolutional neural network (CNN) as the output layer of the CNN may be the prediction vector that gives three classes including imminent over-boil event, boiling event, and non-boiling event, with corresponding confidence levels. Another solution presented by the embodiments disclosed herein to address this challenge may be a deterministic method by detecting foreign objects in an over-boil region as the over-boil region being populated by foreign objects may subsequently alter the current RGB pixel values relative to the steady state average, allowing for instantaneous detection of over-boil.

Certain embodiments disclosed herein may provide one or more technical advantages. A technical advantage of the embodiments may include improved overall cooking experience for the user as the smart hood apparatus may leverage sensor fusion, computer vision and sensor related technologies to make informed decisions for monitoring of boiling fluid. Certain embodiments disclosed herein may provide none, some, or all of the above technical advantages. One or more other technical advantages may be readily apparent to one skilled in the art in view of the figures, descriptions, and claims of the present disclosure.

Studies show that leisure time is getting increasingly squeezed by the modern lifestyle. More and more people are attempting to multitask and do many chores and household activities at once. Oftentimes when cooking, people may try to do multiple things at once to save time. A common annoyance may be putting something out to boil and having to come and check on it every few minutes to see if it is ready. This time may better be spent doing another activity rather than going back and forth to the kitchen constantly. Similarly, it may be frustrating when the contents of the cooking utensil overflow and lead to a huge mess on the cooktop/stovetop. While products such as a smart cooktop/stovetop may control the burners, one area that may be lacking is direct interaction/monitoring of the actual contents on the cooktop/stovetop. Various features like boiling detection, boiling time estimate, over-boil prevention and active over-boil detection may be largely missing in the current smart kitchen environment. A product introducing these features in a manner that can be actuated on by either a kitchen robot assistant, a smart stovetop, or a human may increase the versatility of the product, allowing it to reach as many households as possible.

In particular embodiments, the smart hood apparatus disclosed herein may hold the aforementioned features. The smart hood apparatus may be implemented as a universal, low-cost range hood upgrade that may improve the cooking experience for any kitchen design with the considerations of aesthetics, technological compatibility with other appliances and cost. Regarding aesthetics, the smart hood apparatus may be easily attached to existing stoves and range hoods. There may be no need to substitute a user's stove or range hood that already matches the style of the kitchen. The casing of the smart hood apparatus may be customized to match common kitchen appliance finishes. Furthermore, the embodiments disclosed herein may eliminate the need for other bulkier and awkward looking devices like instant pots or large kettles, which may reduce clutter on the cooktop/stovetop and thus improve the kitchen aesthetic. Regarding technological compatibility, the versatility of the smart hood apparatus may allow it to be seamlessly plugged in to a smart kitchen environment or conversely it may also operate in a traditional, non-smart kitchen atmosphere. Regarding cost, the smart hood apparatus may be designed to be a low-cost product using a host of easy-to-acquire sensor technologies. In addition, by removing the necessity of other cooking devices like instant pots, this may save cost in the context of the overall kitchen.

FIG. 1 illustrates an example architecture 100 of a smart hood apparatus. In particular embodiments, the smart hood apparatus may comprise one or more sensors 110. The one or more sensors 110 may comprise one or more of a thermal sensor 110a, an RGB camera 110b, an audio sensor 110c, or a depth sensor 110d. As an example and not by way of limitation, the thermal sensor 110a may comprise one or more of a resistive bolometer based thermal detection imaging camera, a pyroelectric based thermal detection imaging camera, an infrared thermometer sensor, or a temperature probe. As another example and not by way of limitation, the RGB camera 110b may comprise one or more of a CCD (charge-coupled device) sensor camera or a CMOS (complementary metal oxide semiconductor) sensor camera. As another example and not by way of limitation, the audio sensor 110c may comprise one or more of a cardioid microphone, an omnidirectional microphone, or a shotgun microphone. As another example and not by way of limitation, the depth sensor 110d may comprise one or more of an ultrasonic sensor, a ToF (time of flight) camera, a Lidar, a radar, or a stereo camera.

In particular embodiments, the sensors 110 may be linked to the mechanical/hardware components 120 via linking hardware 130 (e.g., screws plus nuts, interference fit, etc.) The purpose of the mechanical/hardware components 120 may be to attach the sensor brigade to a mounting apparatus on the smart hood. In particular embodiments, the mechanical/hardware components 120 may comprise a mechanical housing 122 and a range hood mount 124. As an example and not by way of limitation, the mechanical housing 122 may be comprise one or more of an aluminum case or a stainless steel case. As another example and not by way of limitation, the range hood mount 124 may comprise a rectangular mounting magnet, or screws plus bracket.

In particular embodiments, the controller unit 140 may use the raw sensor data 150 as input and via algorithmic analysis it may output actionable events 160 and/or prompts 170 to the event actuation hardware 180 or for human intervention 190. As an example and not by way of limitation, the controller unit 140 may comprise one or more of an embedded system, a personal computer (PC), or a small form factor mini PC. As another example and not by way of limitation, the event actuation hardware may comprise one or more of a robot kitchen assistant, or a smart stovetop.

Figure 2:
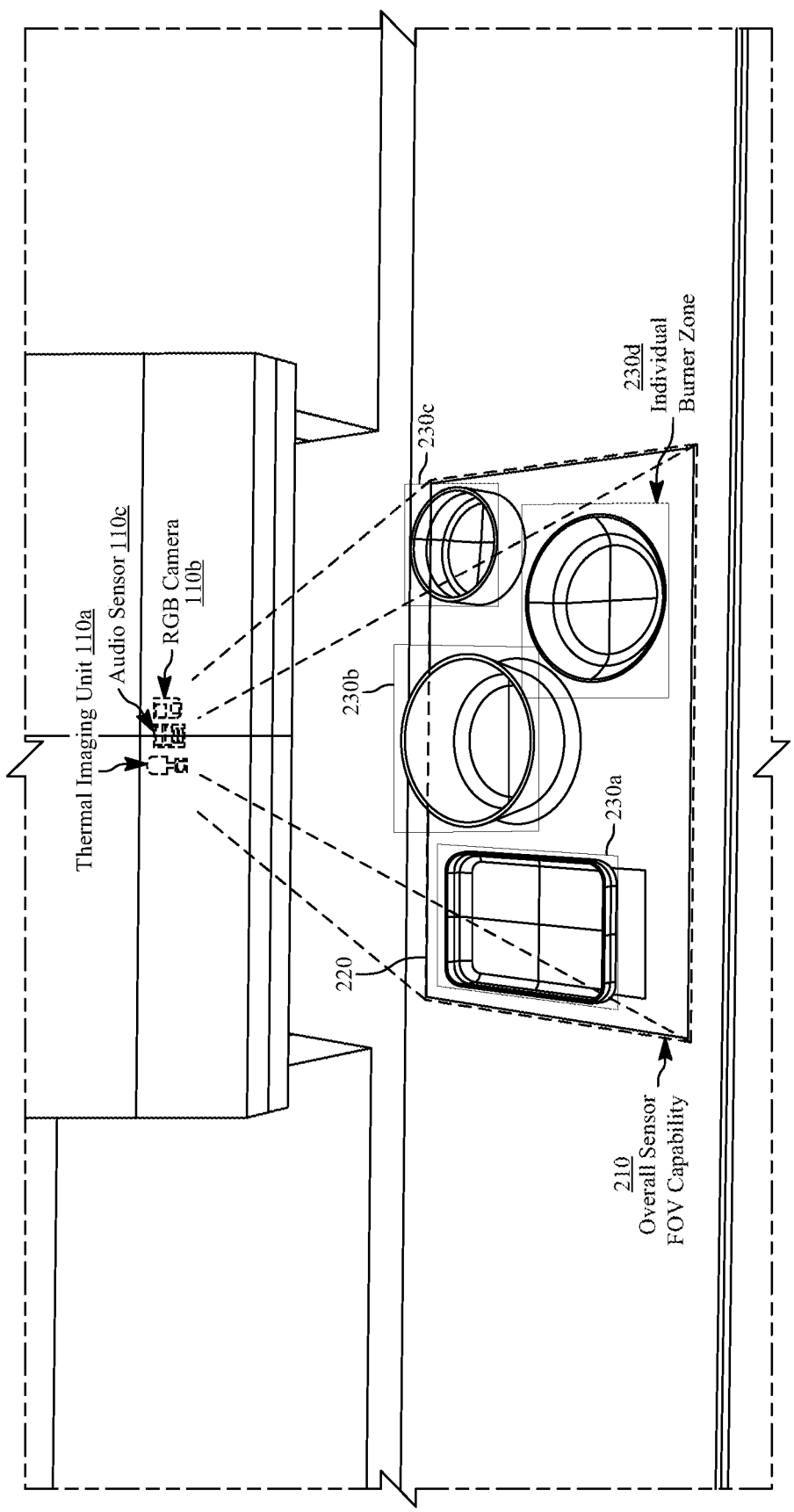
FIG. 2 illustrates an example configuration for identifying burner zones based on sensor data.

FIG. 2 illustrates an example configuration for identifying burner zones based on sensor data. The embodiment descriptions may focus on the algorithmic approach for a single cooking utensil or burner on the cooktop/stovetop for simplicity. However, the embodiments disclosed herein may cover any arbitrary layout of burners/utensil locations on a cooktop/stovetop. In particular embodiments, the smart hood apparatus may identify the burner zones using a machine-learning model trained on a variety of cooktops/stovetops. The smart hood apparatus may run the machine-learning model independently on each burner zone by masking the sensor data appropriately. As demonstrated in FIG. 2, the sensors 110 including the thermal imaging unit 110a and the RGB camera 110b may have an overall sensor field-of-view (FOV) capability 210 with respect to the cooktop/stovetop 220. The individual burner zone 230a-d may be within the overall sensor FOV capability 210. The sensors 110 may additionally include an audio sensor 110c. In terms of the primary sensors 110 shown in FIG. 2, the smart hood apparatus may leverage sensor fusion technologies to make use of all the sensors 110. In particular embodiments, the smart hood apparatus may also opt out of the sensor fusion approach and operate with any lesser combination of sensors 110.

In particular embodiments, the smart hood apparatus may achieve boiling time prediction and boiling detection via analysis of thermal data, RGB camera data, depth sensor data and audio data. The time to boiling may be accurately estimated by fitting a model to the temperature changes over time. The fusion of these sources of sensor data may provide an accurate indication that boiling has occurred and may account for any additional elements such as a lid on top of the pot. In particular embodiments, the boiling time prediction may be given to the user via a smartphone application or a display on the cooktop/stovetop, allowing the user to attend to other matters rather than supervise the boiling process. Boiling detection may confirm the actual boiling event, prompting the user to return to the kitchen.

Figure 3:
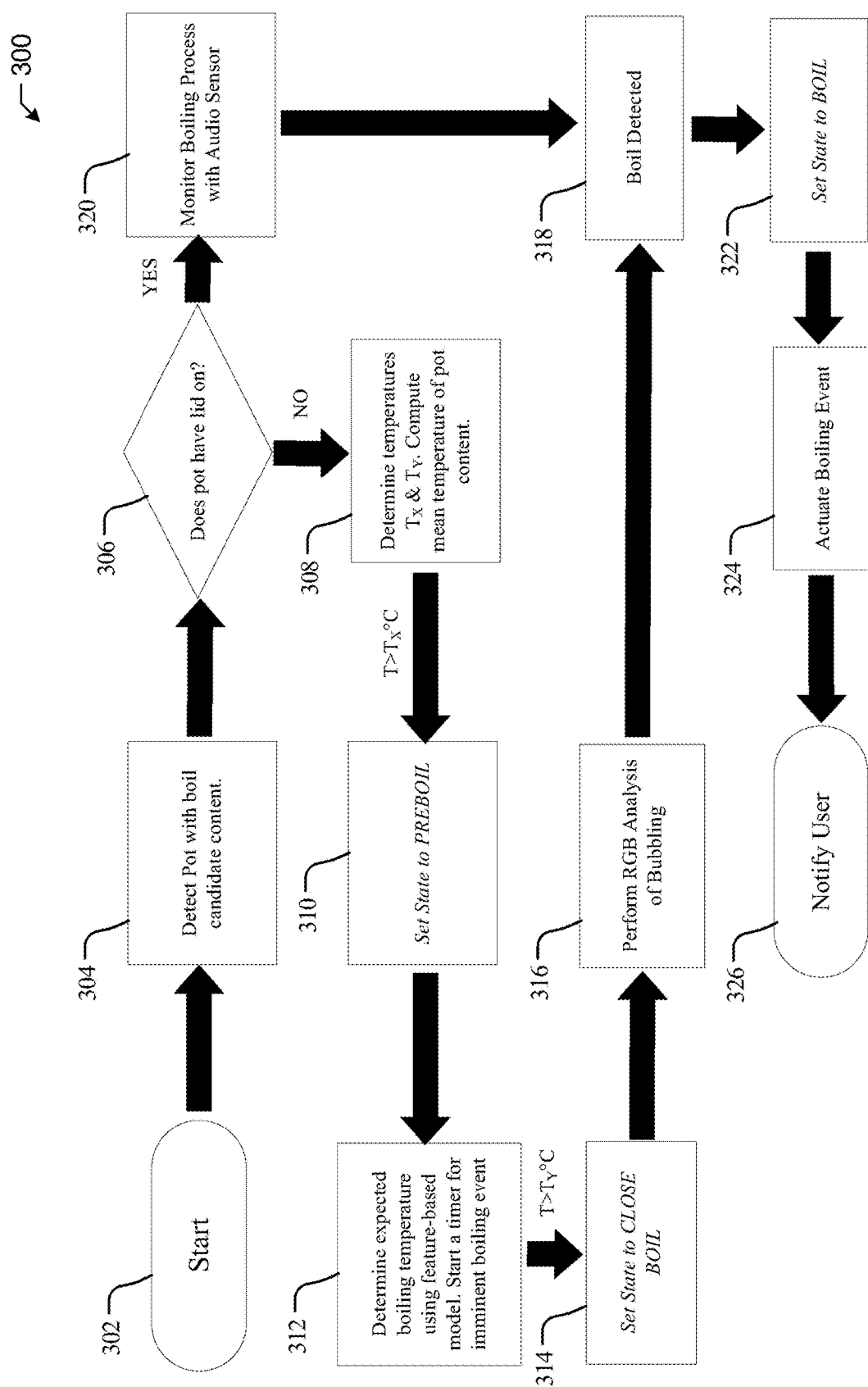
FIG. 3 illustrates an example flow diagram for boiling time prediction and boil detection.

FIG. 3 illustrates an example flow diagram 300 for boiling time prediction and boil detection. The example flow diagram may be based on an example embodiment where the smart hood apparatus relies on a RGB imaging camera 110b, a thermal imaging camera 110a, and a microphone plus amplifier system for boiling time prediction and boil detection. In particular embodiments, sensor fusion may be used to obtain stronger results. A state machine may be used to track the progression of the contents in the pot through the boiling process. The actuation of the boiling event may be done by either a robotic kitchen assistant, a smart appliance or human intervention.

After the start 302 of the process and at step 304, the smart hood apparatus may detect the pot with boiling candidate content inside of it. In particular embodiments, a machine-learning model may be used to determine the boiling candidate content (e.g., based on sensor data captured by the RGB camera). Usually the candidate content may be water at room temperature, but the candidate content may be any suitable cooking medium/fluid. In particular embodiments, step 304 may be performed in either the RGB camera realm or the thermal camera realm. The result may be then translated across realms using a homography (i.e., relation of two images of the same planar surface).

Figure 4A:
FIGS. 4A-4B illustrate example detections of the pot outline.
Figure 4B:
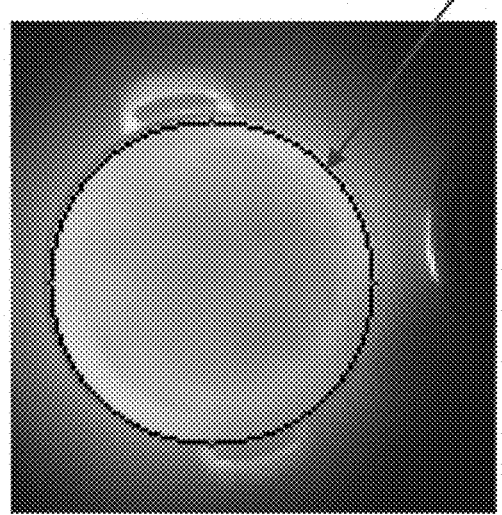

FIGS. 4A-4B illustrate example detections of the pot outline. FIG. 4A illustrates an example detection of the pot outline using RGB camera. In terms of the RGB camera, a Hough circle transform may be applied to the sensor data captured by the RGB camera to identify the circular pot region of interest, i.e., the detected pot outline 410. Alternatively, a machine-learning model may be trained to detect pots on a cooktop/stovetop by using a collection of online images and locally obtained images as training data. The smart hood apparatus may then use such machine-learning model to detect the pot outline 410. FIG. 4B illustrates an example detection of the pot outline using RGB thermal imaging camera. For the thermal imaging camera, a similar technique of a Hough circle transform may be used to isolate the pot circle region, i.e., the detected pot outline 420. Again, a machine-learning model may also be trained for this purpose as well.

At step 306, the smart hood apparatus may use the RGB camera to detect if a lid is present on the pot or not, either through a machine-learning approach or deterministic method of searching for lid handle features. If there is no lid, the smart hood apparatus may determine the temperatures $T_X$ and $T_Y$ and compute the mean temperature of the pot content at step 308, using a combination of the sensor data captured by the thermal and RGB cameras. In particular embodiments, $T_X$ may represent a marked increase from the starting temperature of the boiling candidate while $T_Y$ may represent a temperature close to (and lower than) the expected boiling point of the candidate. As an example and not by way of limitation, if the thermal camera determines the content in pot is at 25° C., $T_X$ may be set to 30° C. so it is slightly above the starting temperature of the content. As an example and not by way of limitation, $T_Y$ may be set to 85° C. because it is slightly before the boiling point of water which is 100° C.

Figure 5:
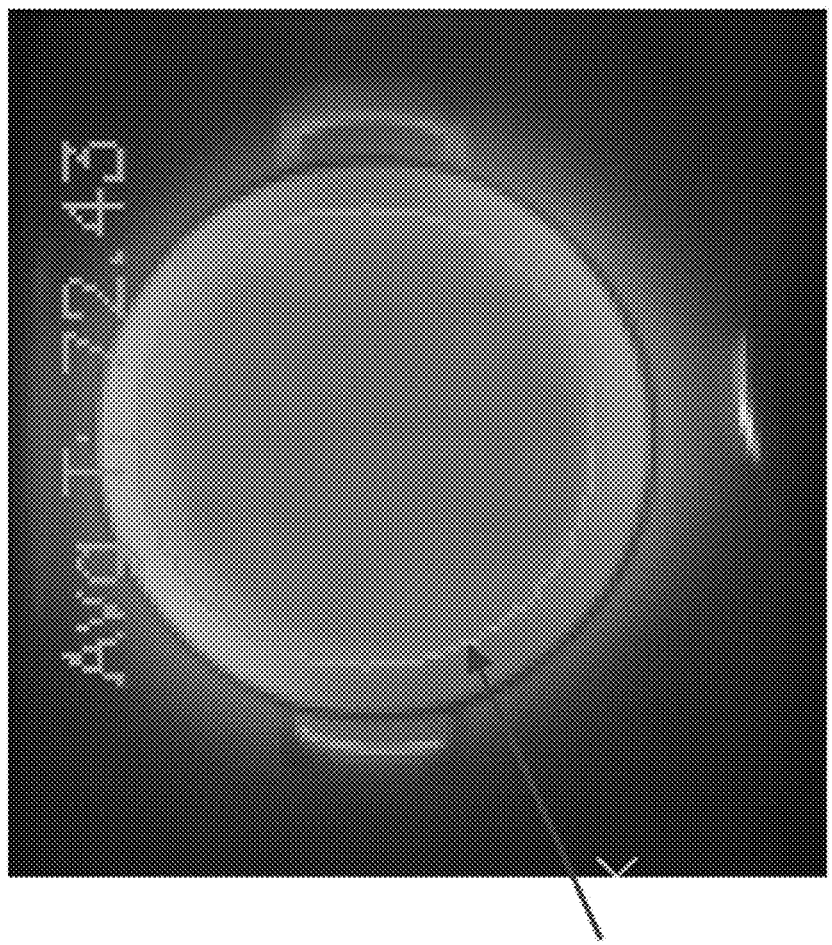
FIG. 5 illustrates an example circular mask of the pot content.

FIG. 5 illustrates an example circular mask of the pot content. Following the flow diagram 300, if the pot does not have a lid, the mean temperature of the content in the pot may be also computed at step 308. One way of computing the mean temperature may be by applying a circular mask 510 corresponding to the detected pot circle to the thermal image 520, as demonstrated in FIG. 5. Subsequently the average of all the pixels contained within the pot may be taken and the sensor specific formula to convert to temperature may be applied. An alternate method to obtain the mean temperature of the content may be to use an infrared temperature sensor pointed into the pot, or a temperature probe placed inside the pot. For any non-contact temperature sensor, it may optionally be synchronized with the range hood fume extraction capabilities to increase the reading accuracy.

Figure 6:
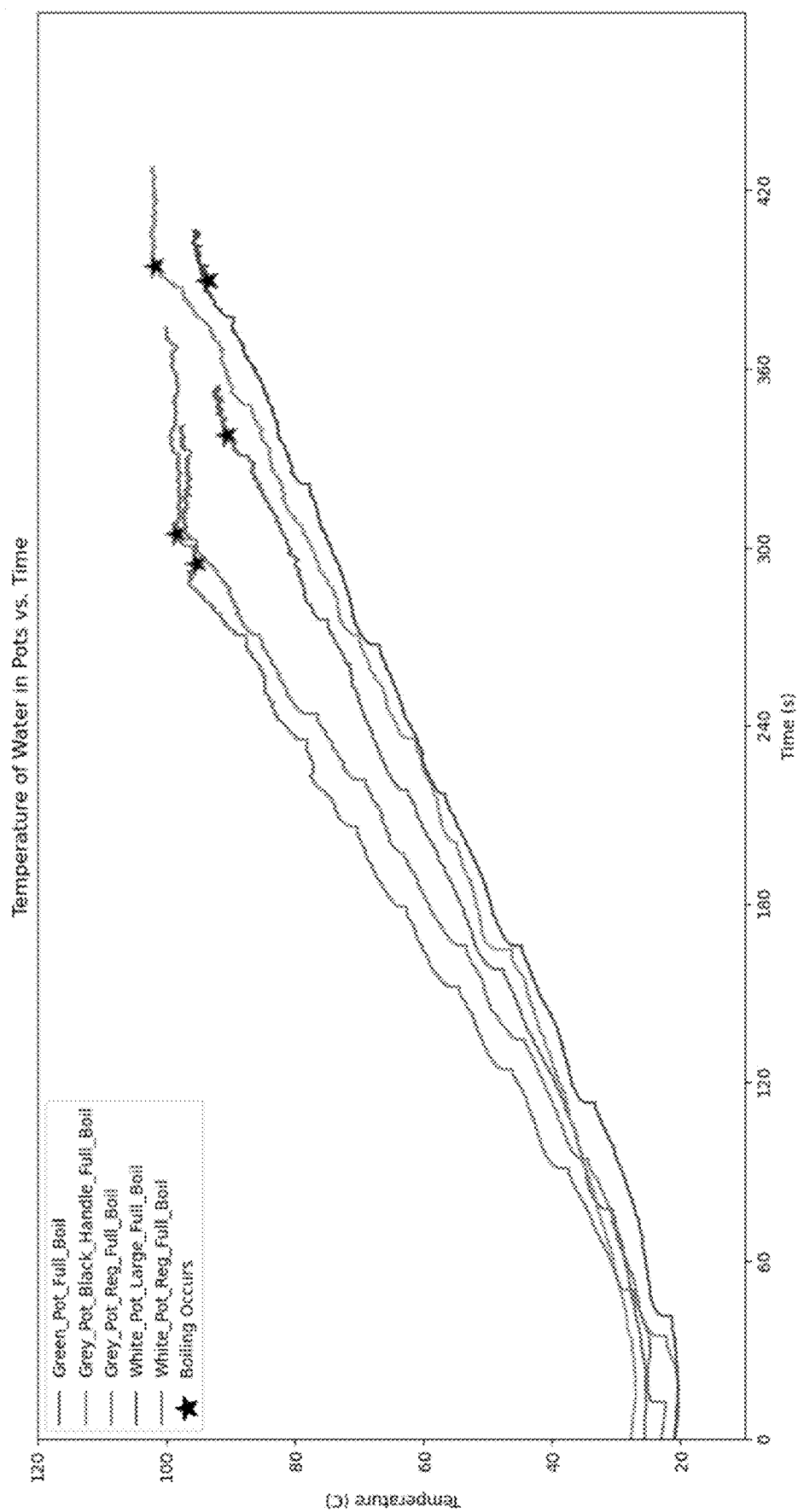
FIG. 6 illustrates an example relationship between the mean temperature of the pot content and time.

At this point, when the mean temperature of the pot content exceeds Tx (i.e., T>Tx), the state machine may enter the preboil stage at step 310, i.e., by setting the state to PREBOIL. At step 312, the smart hood apparatus may determine expected boiling temperature using feature-based model and start a timer for imminent boiling event. In the preboil stage, the features of the pot and the temperature increase rate may be used to estimate the total boiling time remaining. A variety of techniques like linear fitting to temperature versus time curves or analysis of the visual appearance of the pot content over time may be used to generate the rate of boiling. Furthermore, to pinpoint the exact boiling point, features of the components in play such as pot radius, boiling candidate depth and type of stove may be culminated into a more accurate boiling point estimate. In particular embodiments, a machine-learning approach may also create a model that is trained on these features and training examples where a human has labelled the boiling event. A machine-learning model trained on various features associated with the cooking utensil and fluid in it may be an effective solution for addressing the technical challenge of accurately estimating boiling time as these features may provide comprehensive information about the boiling task to enable the model make a reliable estimation. FIG. 6 illustrates an example relationship between the mean temperature of the pot content and time. The pot content for this example relationship may be water. In particular embodiments, a linear model may be fit to such relationship to generate an estimation for the boiling point at any given time.

Figure 7:
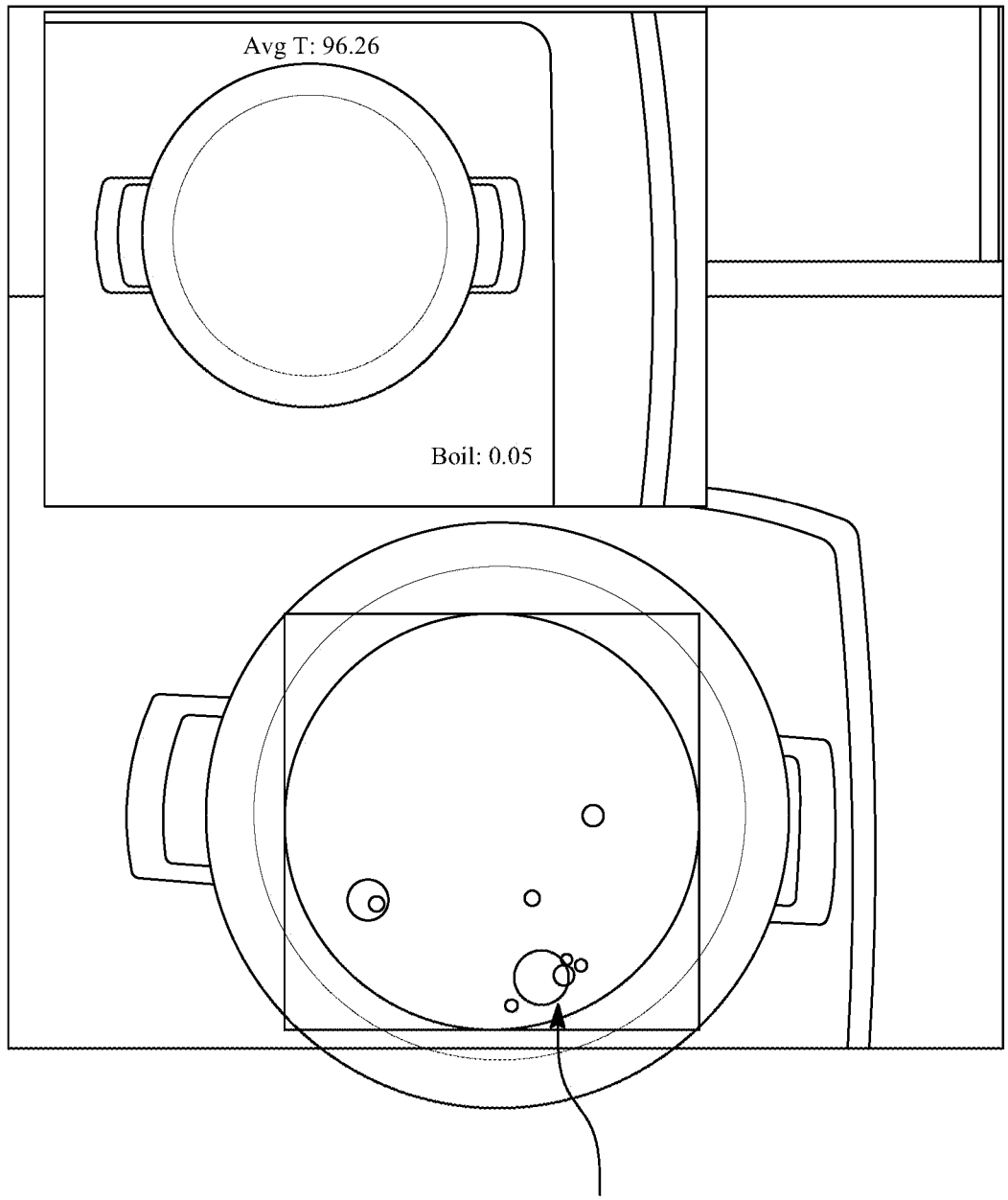
FIG. 7 illustrates an example detection of bubble circles.

Once the mean temperature of the pot content has exceeded the $T_Y$ threshold (i.e., $T>T_Y$), the state machine may set the state to CLOSE BOILD at step 314. FIG. 7 illustrates an example detection of bubble circles 710. It may be expected to observe bubbling of the boiling candidate. Accordingly, the smart hood apparatus may perform RGB analysis of bubbling at step 316. Such analysis of the bubbling may be performed to confirm when the actual boiling happens. As an example and not by way of limitation, a Hough circle transform searching for much smaller radii and circles within close proximity may count the number of bubble circle candidates. If a pre-defined threshold is exceeded, a boil event may be deemed true, i.e., boil detected at step 318. Detecting active boiling based on detection of bubble circles exceeding a threshold may be an effective solution for addressing the technical challenge of effective detection of active boiling as bubble circles are intuitively correlated to active boiling.

In particular embodiments, at step 306, the smart hood apparatus may alternatively detect a lid on the pot. A lid being on the pot may limit the effectiveness of certain sensors such as thermal imaging camera or RGB camera. As a result, the smart hood apparatus may monitor boiling process with audio sensor at step 320. The smart hood apparatus may process the audio features associated with the boiling pot. Detecting active boiling based on audio features may be an effective solution for addressing the technical challenge of effective detection of active boiling when there is a lid on the cooking utensil as intuitively the boiling process may be distinguished with the human ear, meaning it may be possible to monitor boiling process algorithmically based on audio features as well.

In particular embodiments, a series of audio features may be extracted from the frequency domain representation of the audio signal using windowing (i.e., splitting input audio signal into short-term frames). Table 1 illustrates examples audio features. Using audio features, may be different approaches to detect boiling. As an example and not by way of limitation, the smart hood apparatus may use a deterministic approach to look for specific patterns in certain features such as sustained peaks or troughs. As another example and not by way of limitation, the smart hood apparatus may feed all the features into a machine-learning model (e.g., deep learning), which is trained based on training data comprising various pot and cooktop/stovetop combinations with human labelled boiling points. As another example and not by way of limitation, the smart hood apparatus may use other methods like monitoring noise (e.g., bubbling may cause a lot of chaotic movements) or fitting a machine-learning model that searches for unique characteristics of boiling to detect boiling.

TABLE 1

Example audio features.

| Feature Name | Description |
| --- | --- |
| Zero Crossing Rate | The rate of sign-changes of the signal during the duration of a particular frame. |
| Energy | The sum of squares of the signal values, normalized by the respective frame length. |
| Entropy of Energy | The entropy of sub-frames' normalized energies. It can be interpreted as a measure of abrupt changes. |
| Spectral Centroid | The center of gravity of the spectrum. |
| Spectral Spread | The second central moment of the spectrum. |
| Spectral Entropy | Entropy of the normalized spectral energies for a set of sub-frames. |
| Spectral Flux | The squared difference between the normalized magnitudes of the spectra of the two successive frames. |
| Spectral Roll-off | The frequency below which 90% of the magnitude distribution of the spectrum is concentrated. |
| MFCCs | Mel Frequency Cepstral Coefficients form a cepstral representation where the frequency bands are not linear but distributed according to the mel-scale. |
| Chroma Vector | A 12-element representation of the spectral energy where the bins represent the 12 equal-tempered pitch classes of western-type music (semitone spacing). |
| Chroma Deviation | The standard deviation of the 12 chroma coefficients. |

Figure 8:
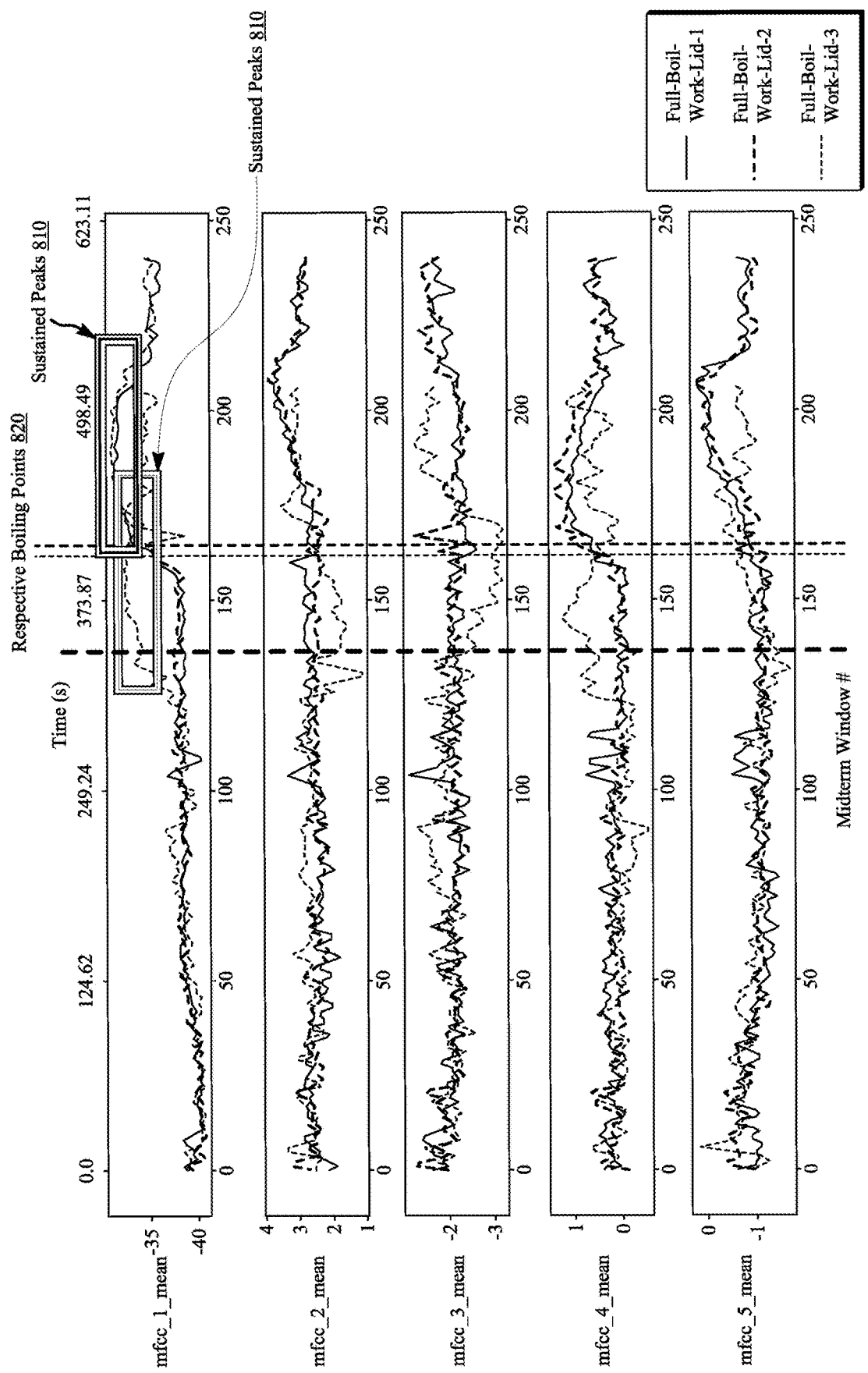
FIG. 8 illustrates example MFCC features for a series of boiling events.

FIG. 8 illustrates example MFCC features for a series of boiling events. FIG. 8 shows the MFCC features for a series of boiling events, where the short-term features have been averaged over a larger midterm window. As an example and not by way of limitation, to detect boiling, the smart hood apparatus may search for sustained peaks 810 in MFCC_1_mean around the respective boiling points 820 as identified in FIG. 8. A similar idea may be applied to any of the audio features listed in Table 1.

After boil is detected, the state machine may set state to BOIL at step 322. At step 324, the smart hood apparatus may actuate the boiling event, e.g. via a robot kitchen assistant or a smart stovetop. At step 326, the smart hood apparatus may notify the user, e.g., via a smartphone application or a display on the cooktop/stovetop.

Figure 9:
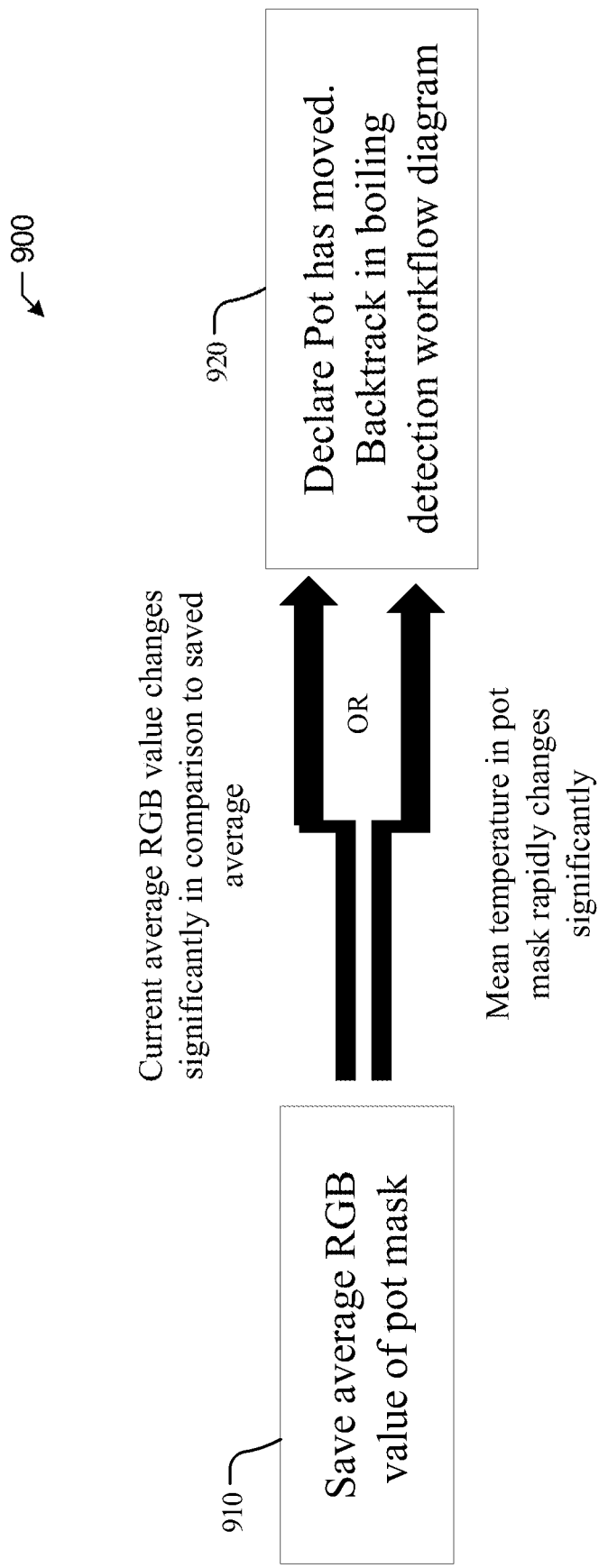
FIG. 9 illustrates an example process for backtracking pot mask.

FIG. 9 illustrates an example process 900 for backtracking pot mask. One aspect of the flow diagram 300 for boiling detection that needs to be considered may be whether the pot is moved at any point by the user. The move of the pot may result in a necessitated backtrack in the flow diagram 300 to re-calculate the appropriate pot mask for content averaging purposes. Once the pot is initially detected and the starting temperature is calculated, a background process may be initiated which checks for any changes in the pot position. The process 900 is illustrated in FIG. 9. At step 910, the smart hood apparatus may save the average RGB value of the pot mask. If the current average RGB value changes significantly in comparison to the saved average RGB value or the mean temperature in the pot mask rapidly changes significantly, the smart hood apparatus may declare the pot has moved at step 910. At step 910, the smart hood apparatus may also backtrack in the boiling detection flow diagram 300.

Figure 10:
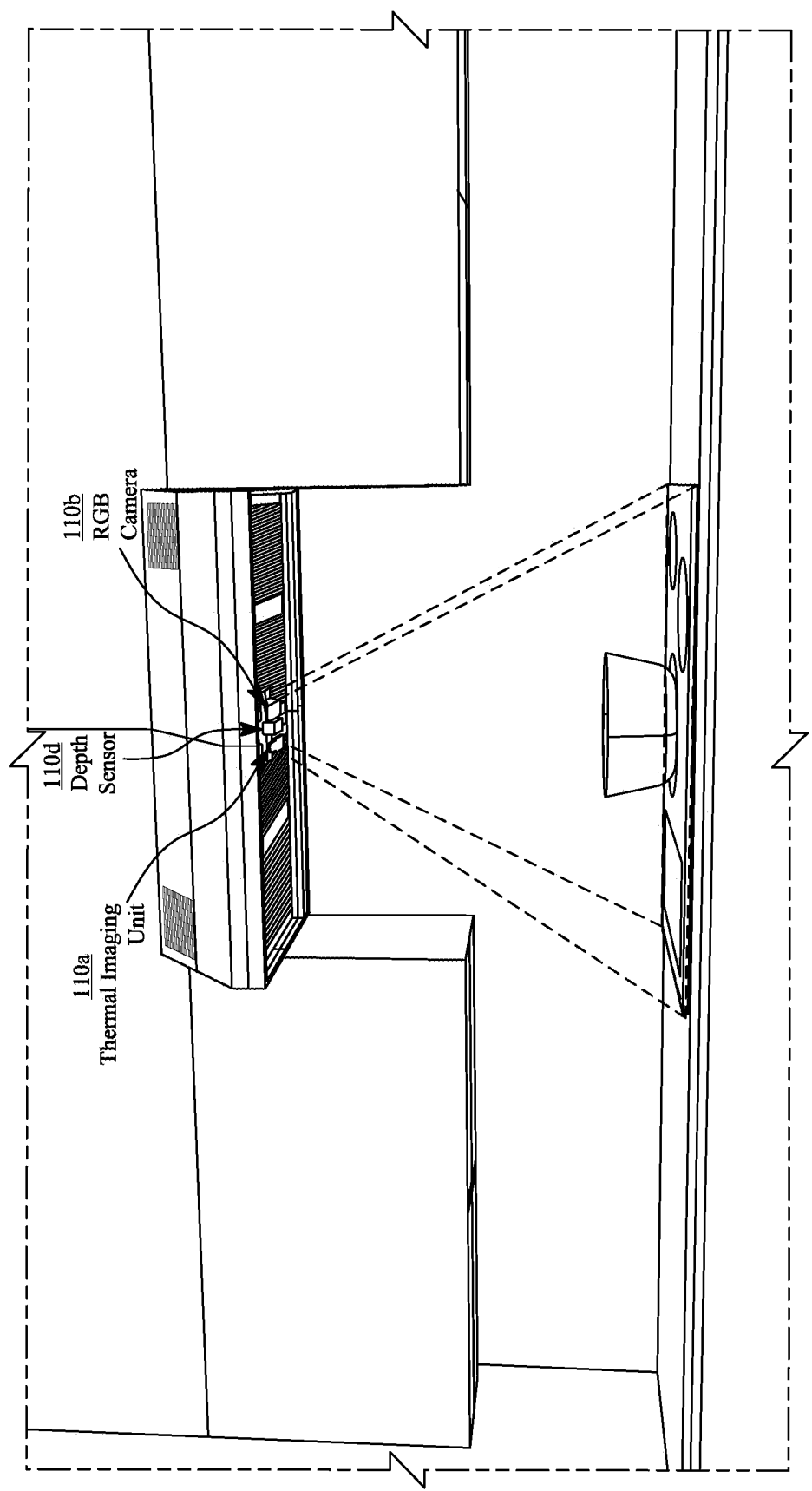
FIG. 10 illustrates an example sensor setup.

FIG. 10 illustrates an example sensor setup. In particular embodiments, the smart hood apparatus may to employ a physics-based heat transfer approach for boiling detection. For this approach, information about the pot size and depth may be required, which thereby necessitates a depth sensor 110*d* and information about the heating element used by the cooktop/stovetop in addition to the thermal imaging unit 110*a* and RGB camera 110*b*. There may exist many paths to calculate the heat transfer of a fluid. One example method may be to use the following heat formula:

$$Q = mc\Delta T \qquad (1)$$

where Q is the heat energy (Joules), m is the mass of the substance in kilogram, c is the specific heat capacity of the substance (i.e., the fluid), and $\Delta T$ is the change in temperature.

Figures 11A, 11B:
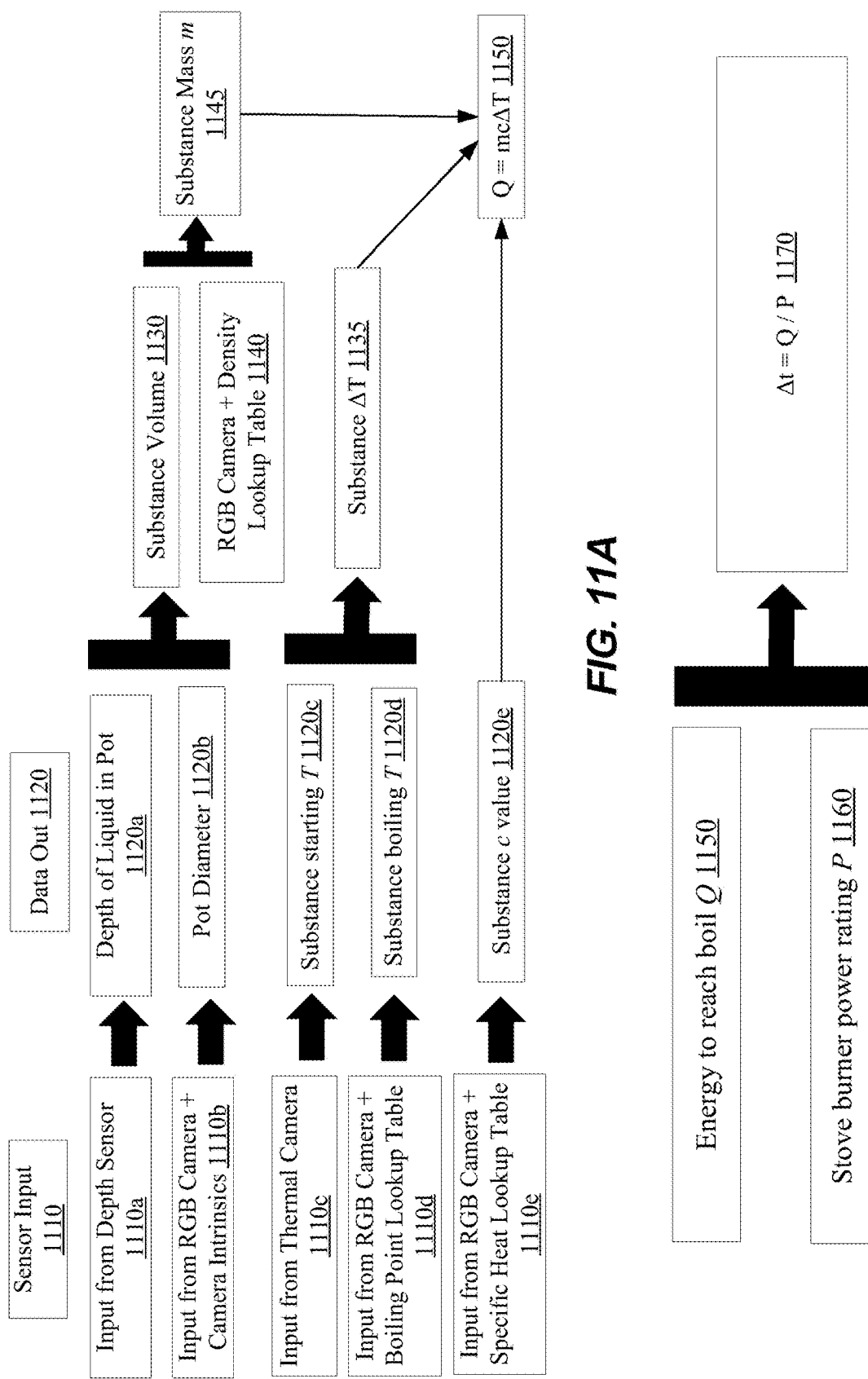
FIGS. 11A-11B illustrate an example flow diagram for estimating the boiling time using the heat equation.

FIGS. 11A-11B illustrate an example flow diagram for estimating the boiling time using the heat equation. In particular embodiments, the sensor input 1110 may comprise input from depth sensor 1110*a*, input from RGB camera plus camera intrinsics 1110*b*, input from thermal camera 1110*c*, input from RGB camera plus boiling point lookup table 1110*d*, and input from RGB camera plus specific heat lookup table 1110*e*. The data output 1120 may comprise the dept of liquid in pot 1120*a*, the pot diameter 1120*b*, substance start temperature (T) 1120*c*, substance boiling temperature (7) 1120*d*, and substance c value 1120*e*. Based on the depth of liquid in pot 1120*a* and the pot diameter 1120*b*, the smart hood apparatus may determine the substance volume 1130. Based on the substance starting T 1120*c* and substance boiling T 1120*d*, the smart hood apparatus may determine the substance $\Delta T$ 1135. Based on the substance volume 1130 and RGB camera plus density lookup table 1140, the smart hood apparatus may determine the substance mass m 1145. The substance mass m 1145, substance c value 1120*e*, and substance 1135 may all be the input to calculate the energy to reach boil Q 1150 using the equation Q=mc$\Delta T$. Knowing the energy to reach boil Q 1150 and the stove burner power rating P 1160, the time to boil $\Delta t$ may be determined using a power equation 1170 (where $\Delta t$ is the time in seconds and P is the power in watts).

Figure 12:
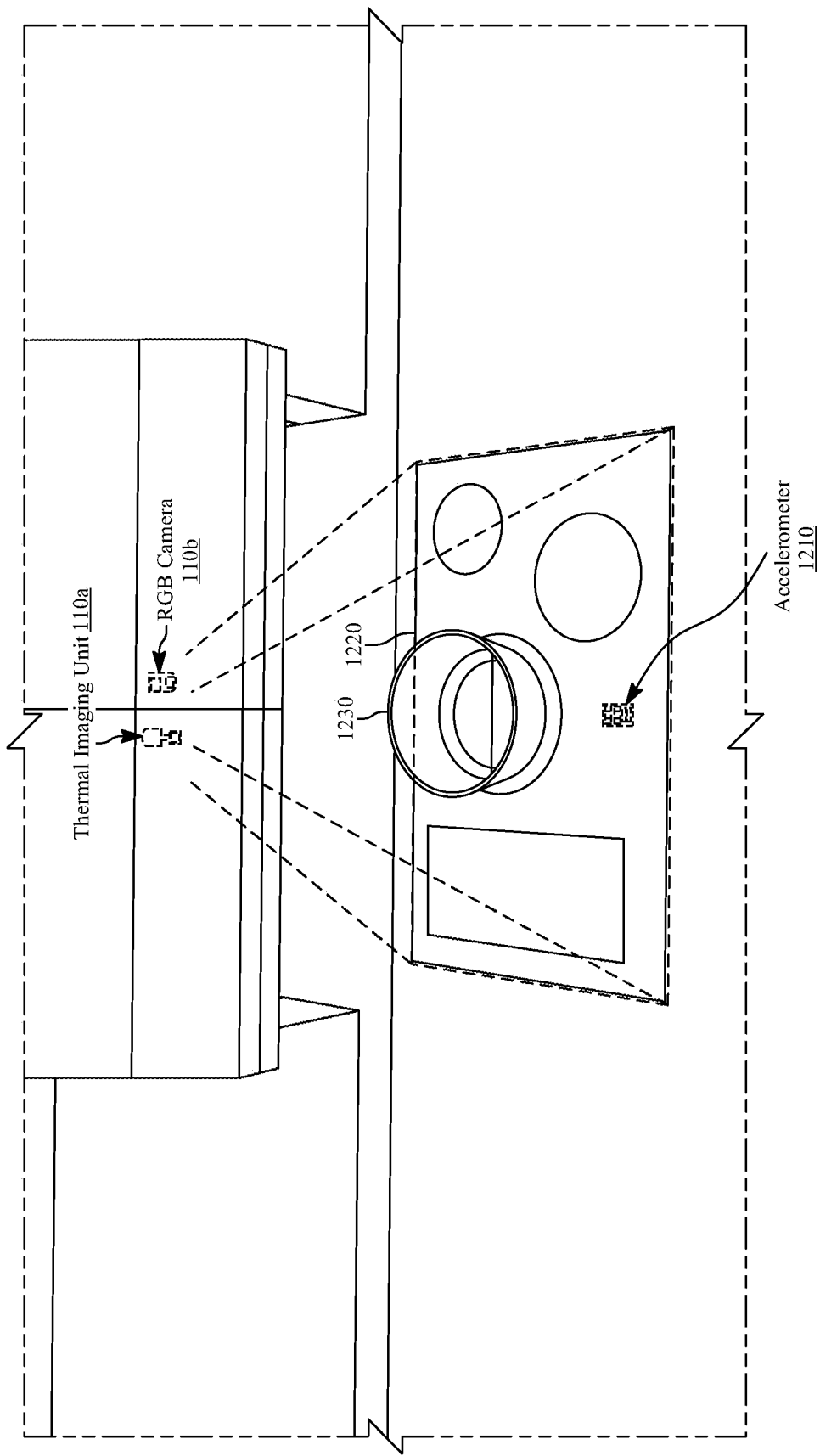
FIG. 12 illustrates another example sensor setup.

FIG. 12 illustrates another example sensor setup. In addition to detecting boiling using an audio sensor 110*c* as previously described, an alternate sensor may be substituted while applying similar signal processing techniques to detect boiling. In particular embodiments, one or more accelerometers 1210 may be placed on the cooktop/stovetop 1220 to measure the vibration caused by the cooking utensil 1230 with boiling content. The accelerometers 1210 may provide a similar signal to one captured by an audio sensor 110*c*. As a result, an analogous process may be applied of extracting a series of features (e.g., those from Table 1) from the frequency domain representation of the vibration signal using windowing.

Figure 13:
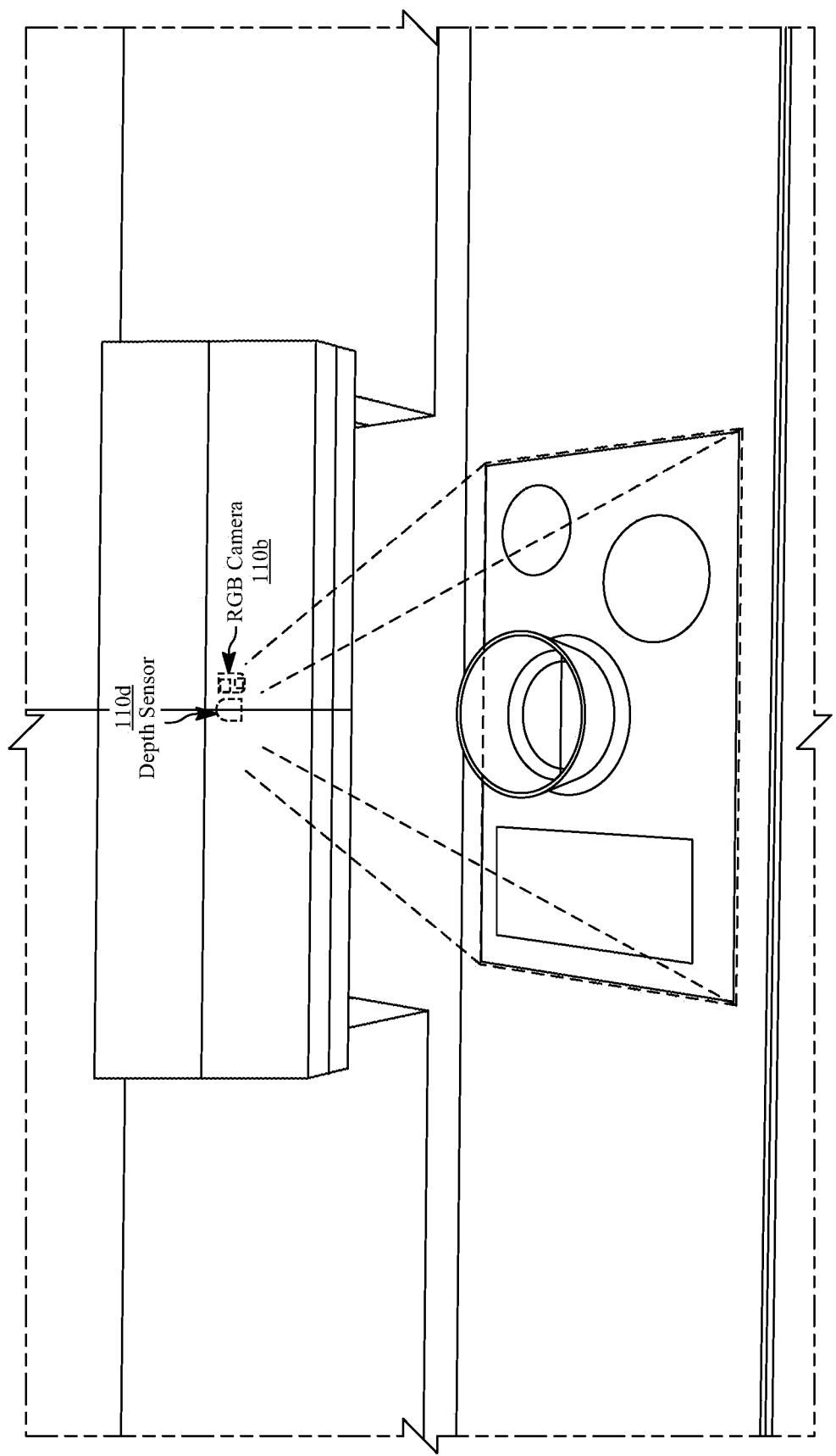
FIG. 13 illustrates an example setup of dual sensor.
Figure 14:
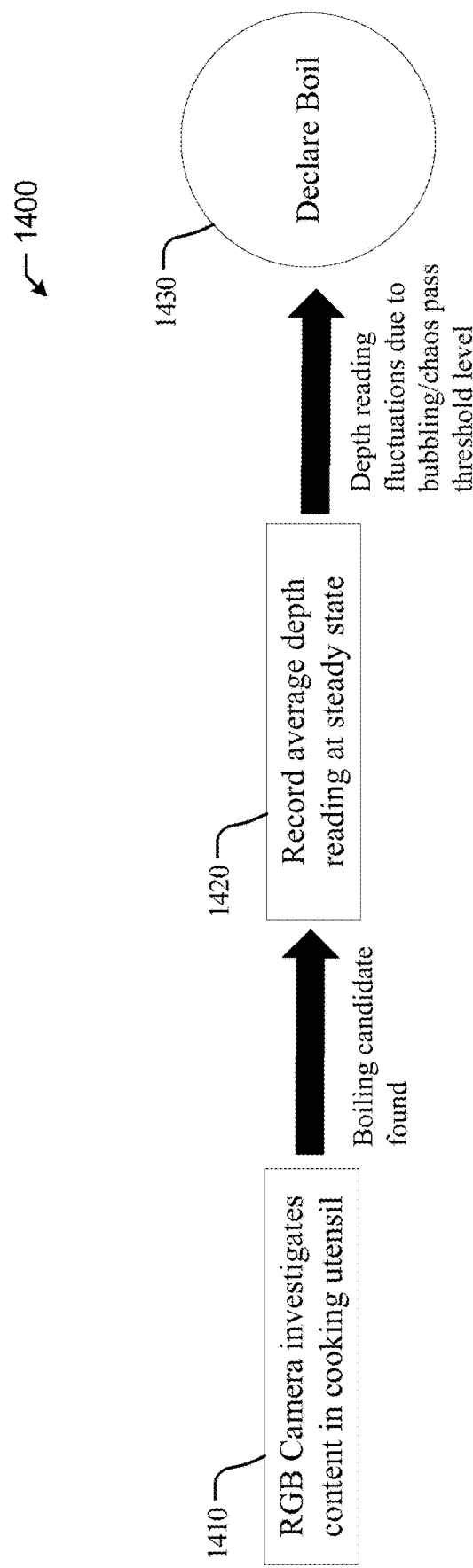
FIG. 14 illustrates an example flow diagram for boiling detection with dual sensor.

FIG. 13 illustrates an example setup of dual sensor. In particular embodiments, for boiling detection, the smart hood apparatus may employ a dual sensor approach of an RGB camera 110*b* and a depth sensor 110*d* as shown in FIG. 13. The RGB camera 110*b* may give the main indication of a boiling candidate while the depth sensor 110*d* may provide a depth reading corresponding to the surface of the boiling candidate. FIG. 14 illustrates an example flow diagram 1400 for boiling detection with dual sensor. At step 1410, the RGB camera 110*b* may investigate the content in the cooking utensil. If boiling candidate is found, the smart hood apparatus may record the average depth reading from the depth sensor 110*d* at steady state at step 1420. If depth reading fluctuations due to bubbling/chaos pass the threshold level, the smart hood apparatus may declare boil at 1430.

Figure 15:
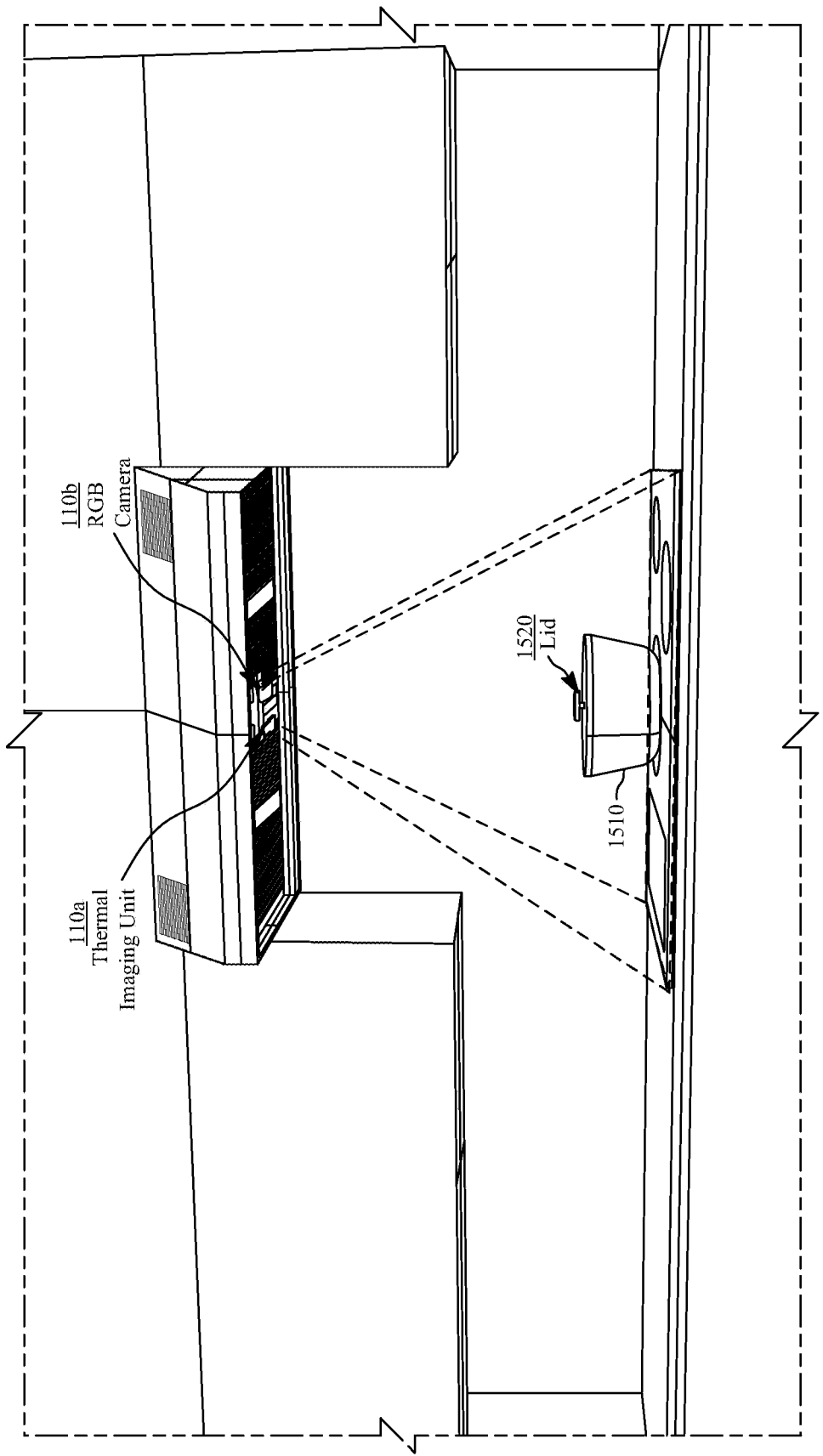

FIG. 15 illustrates an example setting with lid on. In the case of a cooking utensil 1510 with a lid 1520 on, particular embodiments for boiling detection may incorporate an offline-generated model which relates internal content temperature to the surface temperature of the lid 1520. In particular embodiments, the smart hood apparatus may use an RGB camera 110*b* and a thermal imaging unit 110*a*, which may both provide the live data to be fed into the model. The model may be then able to output an estimated time remaining until boil.

Figures 16A, 16B:
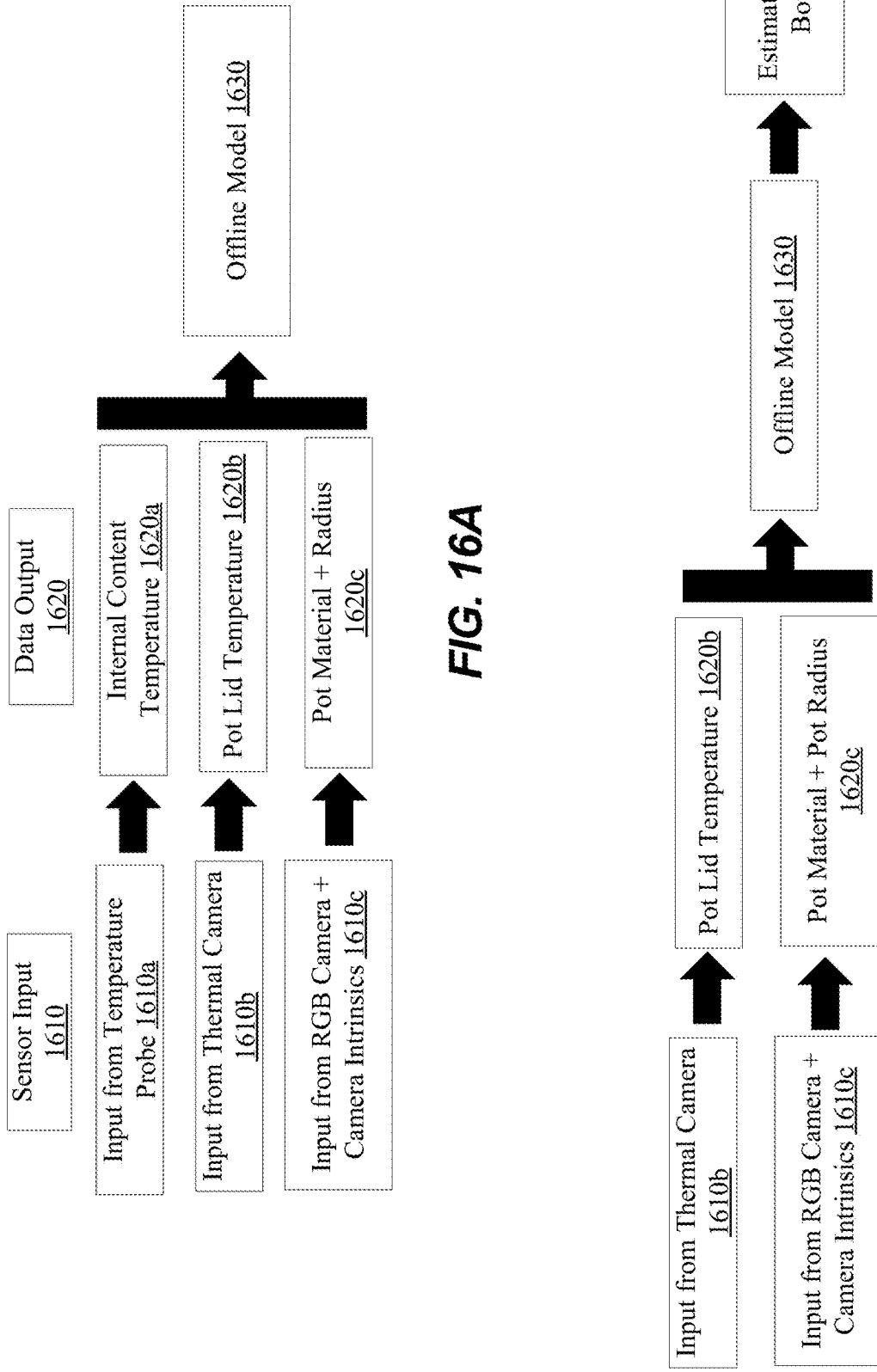

FIG. 16A illustrates an example flow diagram for offline generation of a model that detects boiling in a pot with lid on. To begin with, the generation may require sensor input 1610, which may comprise input from temperature probe 1610*a*, input from thermal camera 1610*b*, and input from RGB camera plus camera intrinsics 1610*c*. Based on the sensor input 1610, the smart hood apparatus may determine data output 1620. As an example and not by way of limitation, internal content temperature 1620*a* may be determined based on input from temperature probe 1610*a*, pot lid temperature 1620*b* may be determined based on input from thermal camera 1610*b*, and pot material plus radius 1620*c* may be determined based on input from RGB camera plus camera intrinsics 1610*c*. In particular embodiments, the smart hood apparatus may further generate the offline model 1630 relating these variables.

FIG. 16B illustrates an example flow diagram of real-time estimation of time to boil. In particular embodiments, the smart hood apparatus may access the input from thermal camera 1610*b* to determine the pot lid temperature 1620*b*. The smart hood apparatus may also access the input from RGB camera plus camera intrinsics 1610*c* to determine the pot material plus pot radius 1620*c*. The pot lid temperature 1620*b* and pot material plus pot radius 1620*c* may be provided to the offline model 1630. The offline model 1630 may further determine the estimated time to boil 1640.

Figure 17:
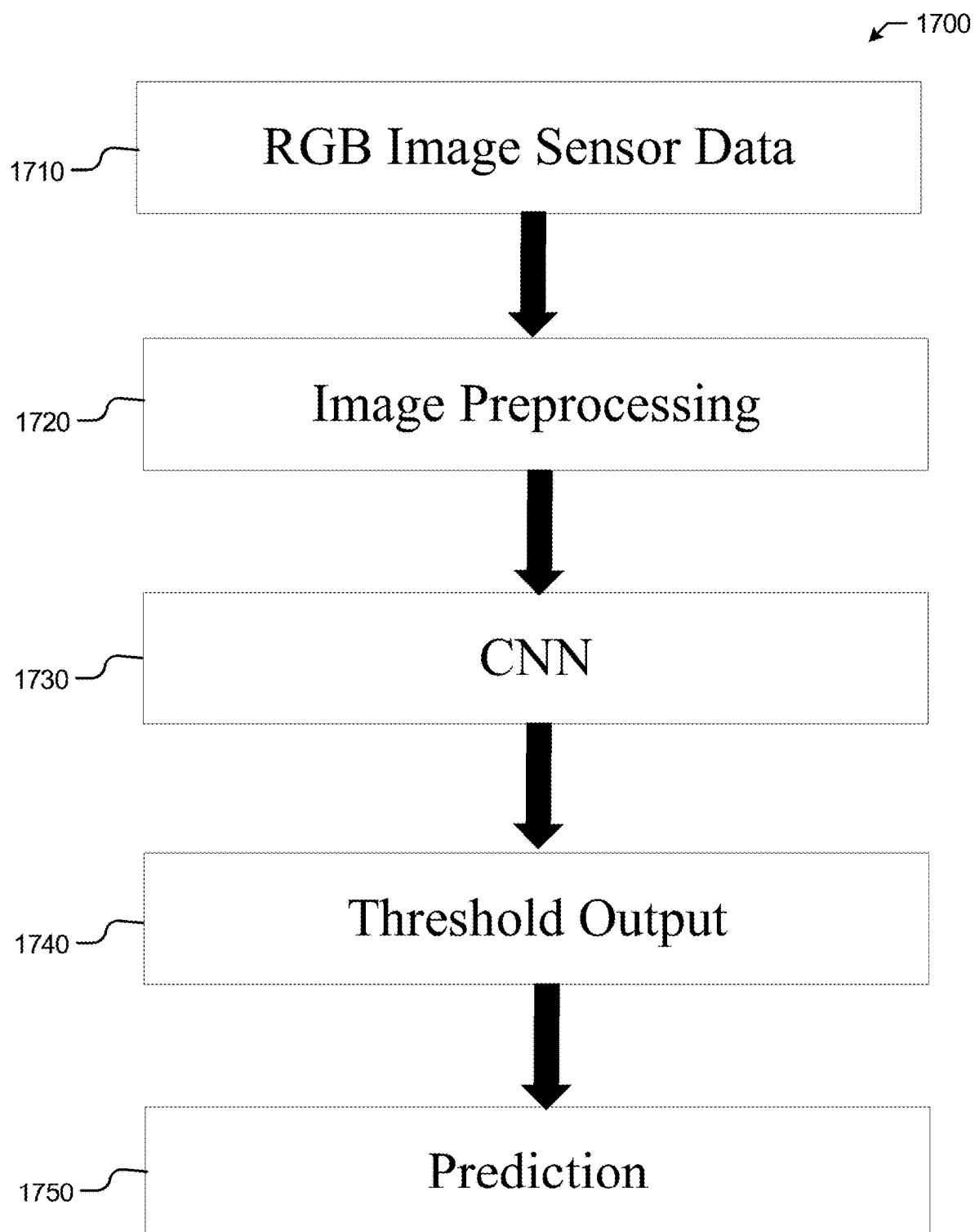
FIG. 17 illustrates an example flow diagram for over-boil prediction.

In particular embodiments, the smart hood apparatus may have another function of over-boil prevention and detection. FIG. 17 illustrates an example flow diagram 1700 for over-boil prediction. In particular embodiments, the RGB image sensor data 1710 may go through image processing 1720. The processed image data may serve as input to a deep-learning over-boil detection model that outputs prediction of over-boil events. As an example and not by way of limitation, the over-boil detection model may be based on a convolutional neural network (CNN) 1730. The over-boil detection model based on a convolutional neural network (CNN) may be an effective solution for addressing the technical challenge of effective detection of over-boil as the output layer of the CNN may be the prediction vector that gives three classes including imminent over-boil event, boiling event, and non-boiling event, with corresponding confidence levels. A threshold output 1740 for the category with the highest confidence level may be used for prediction 1750, i.e., determining the predicted class for the given input RGB image sensor data 1710.

In particular embodiments, the smart hood apparatus may firstly generate a dataset of RGB images of each class to be predicted for training the over-boil detection model. Each class may have a sufficient number of examples to capture the full range of scenarios expected. As an example and not by way of limitation, the classes may include imminent over-boil event, boil event, and non-boiling event. FIG. 18 illustrates example images of different classes of boiling events. These classes may be a boil event 1810, an imminent over-boil event 1820, and a non-boiling event 1830. In particular embodiments, the generated dataset may go through several preprocessing operations including but not limited to: resizing, random cropping, random flip, random rotation with the goal of augmenting training for the over-boil detection model. The dataset may be then split into train, validation, and test sets.

Figure 19A:
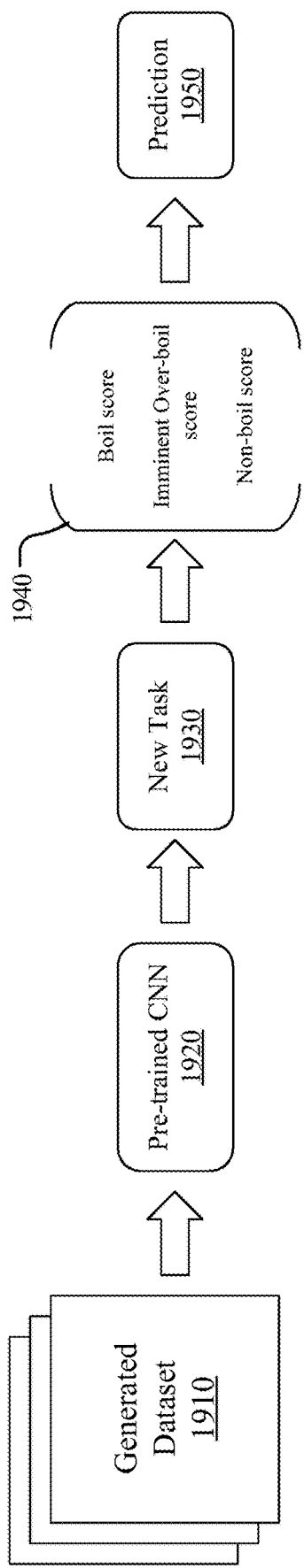
FIG. 19A illustrates an example flow diagram of transfer learning for over-boil detection.

FIG. 19A illustrates an example flow diagram of transfer learning for over-boil detection. During training, the over-boil detection model may be trained on the train set and the evaluation may be performed on the validation set. The test set may be used to evaluate final performance. In particular embodiments, the generated dataset 1910 may be input to a pre-trained CNN 1920. The pre-trained CNN 1920 may be pre-trained on a large-scale image dataset such as ImageNet. We may then use transfer learning to adapt the pre-trained CNN 1920 based on the new task 1930 (i.e., over-boil detection) to output scores 1940 for different classes such as boil, imminent over-boil, and non-boil. The scores 1940 may be further used to make the final prediction 1950.

Figure 19B:
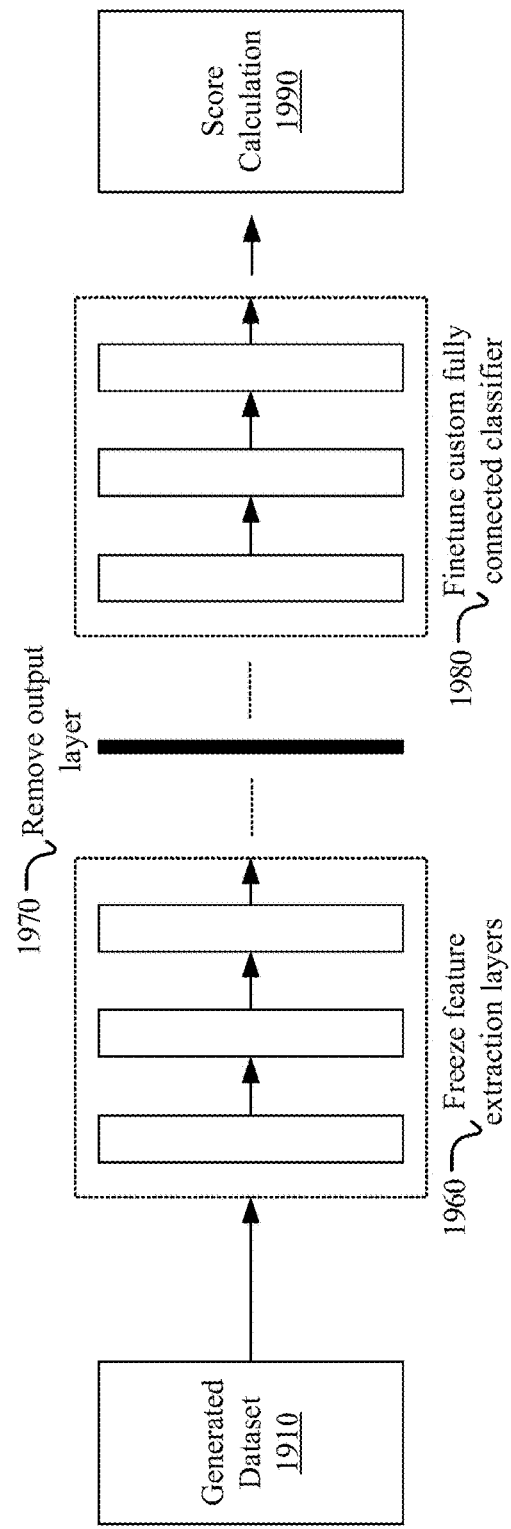
FIG. 19B illustrates an example process of model adaption.

FIG. 19B illustrates an example process of model adaption. In particular embodiments, when inputting the generated dataset 1910 to the pre-trained CNN 1920, the following operations may occur during for the transfer learning. The convolutional neural network may freeze the feature extraction layers 1960, remove the output layer 1970, and finetune the custom fully connected classifier 1980. The finetuned custom fully connected classifier may be used for score calculation 1990.

Figure 20:
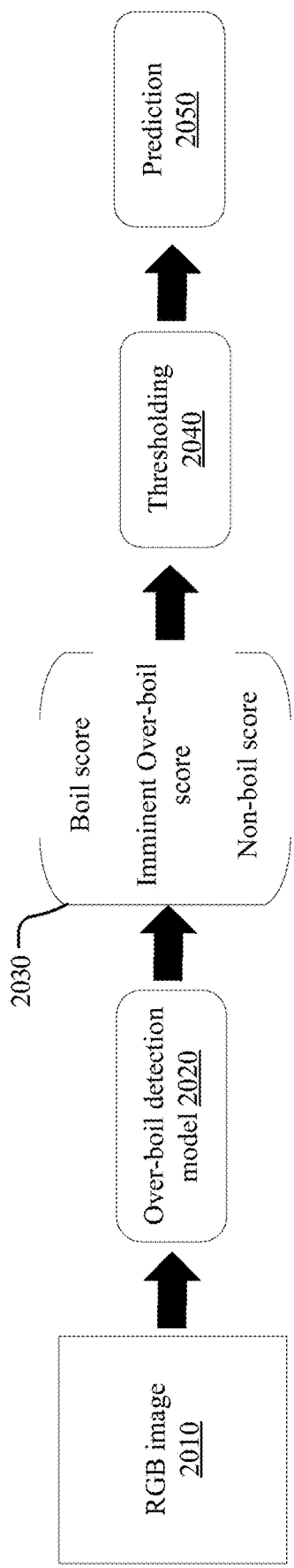
FIG. 20 illustrates an example inference of over-boil.

FIG. 20 illustrates an example inference of over-boil. For inference, the input RGB image 2010 may be passed through the trained over-boil detection model 2020 obtained using the process detailed in FIGS. 19A-19B. The over-boil detection model 2020 may output a vector of confidence scores 2030 that sum up to 1.0, e.g., including boil score, imminent over-boil score, and non-boil score. The vector of confidence scores 2030 may go through thresholding 2040, after which the score with the highest value may be output as the final prediction 2050.

Figure 21:
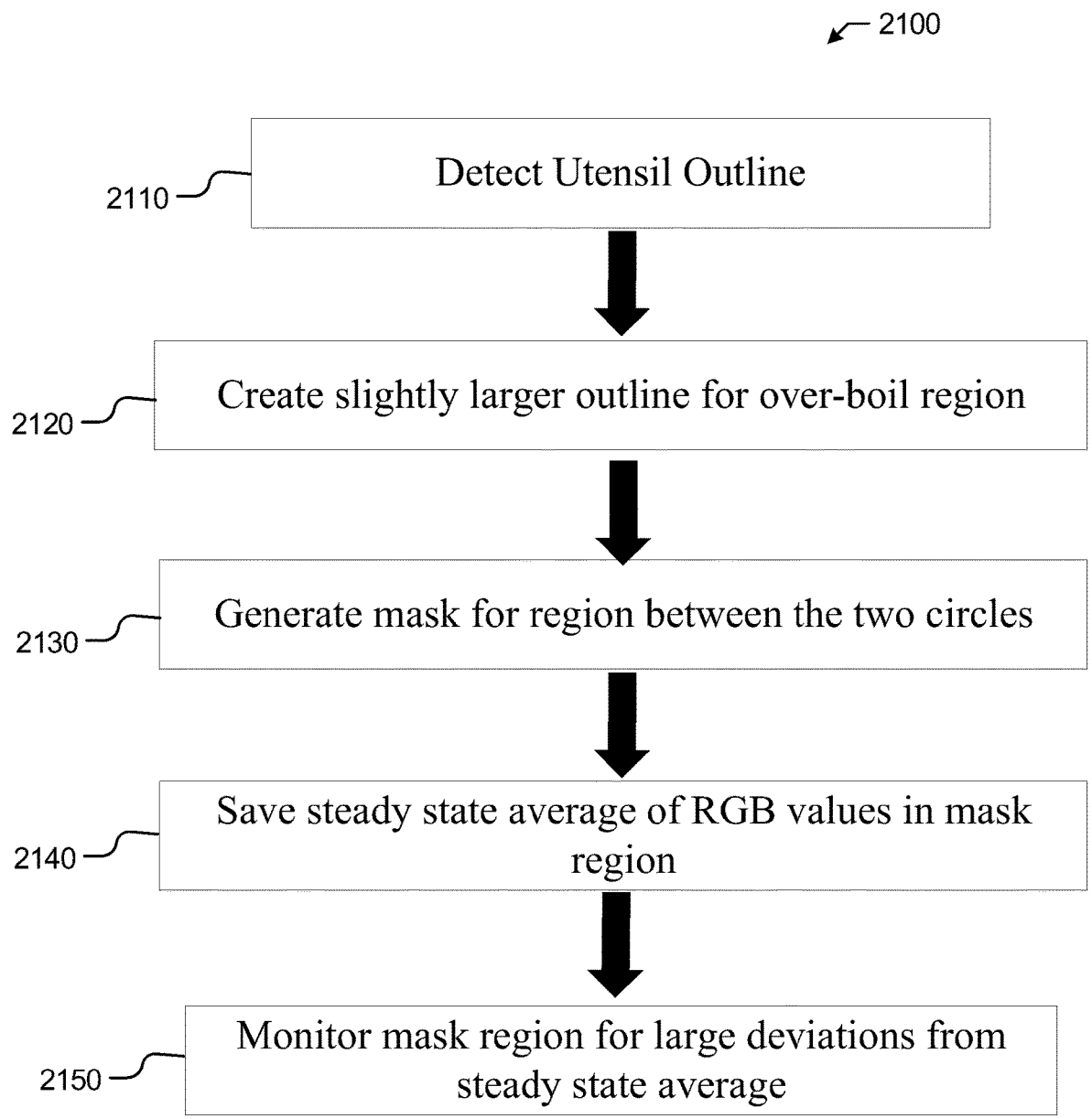
FIG. 21 illustrates an example flow diagram for over-boil detection based on a deterministic method.

FIG. 21 illustrates an example flow diagram 2100 for over-boil detection based on a deterministic method. As a contingency measure, there may be also capability to detect over-boil immediately after it has happened in an effort to turn down the heat of the burner as quickly as possible to limit spillage. This technique may focus on a deterministic method primarily using (but not limited to) the RGB camera 110b. As demonstrated in FIG. 21, at step 2110, the smart hood apparatus may detect the utensil outline. At step 2120, the smart hood apparatus may create slightly larger outline for over-boil region. At step 2130, the smart hood apparatus may generate mask for region between the two circles. At step 2140, the smart hood apparatus may save steady state average of RGB values in mask region. At step 2150, the smart hood apparatus may monitor mask region for large deviations from steady state average.

Figure 22A:
FIG. 22A illustrates an example over-boil region.

FIG. 22A illustrates an example over-boil region. In particular embodiments, the pot outline 2210 in FIG. 22A may be detected either using a Hough Circle transform or with a machine-learning model. After adding a slightly larger circle, i.e., over-boil circle 2220, around the pot outline, the formed over-boil region 2230 may represent the area where spillage would occur outside the immediate boundary of the pot. By taking the average RGB values during steady state (no spillage), this may establish a baseline of the expected empty region. If any spillage occurs, this region 2230 may be populated by foreign objects from the pot which may subsequently alter the current RGB pixel values relative to the steady state average. This may allow for instantaneous detection of over-boil and opportunity to turn down the heat of the burner. A deterministic method by detecting foreign objects in an over-boil region may be another effective solution for addressing the technical challenge of effective detection of over-boil as the over-boil region being populated by foreign objects may subsequently alter the current RGB pixel values relative to the steady state average, allowing for instantaneous detection of over-boil.

Figure 22B:
FIG. 22B illustrates an example detection of over-boil based on the over-boil region.

FIG. 22B illustrates an example detection of over-boil based on the over-boil region. Looking more specifically at detecting over-boil as it is happening using the deterministic RGB camera method, this method may be able to achieve high fidelity due to the versatility of the algorithm. An example is shown in FIG. 22B. There may be spillage 2240 of contents into the over-boil region 2230. Accordingly, the smart hood apparatus may generate an indication 2250 that over-boil occurred.

Figure 23:
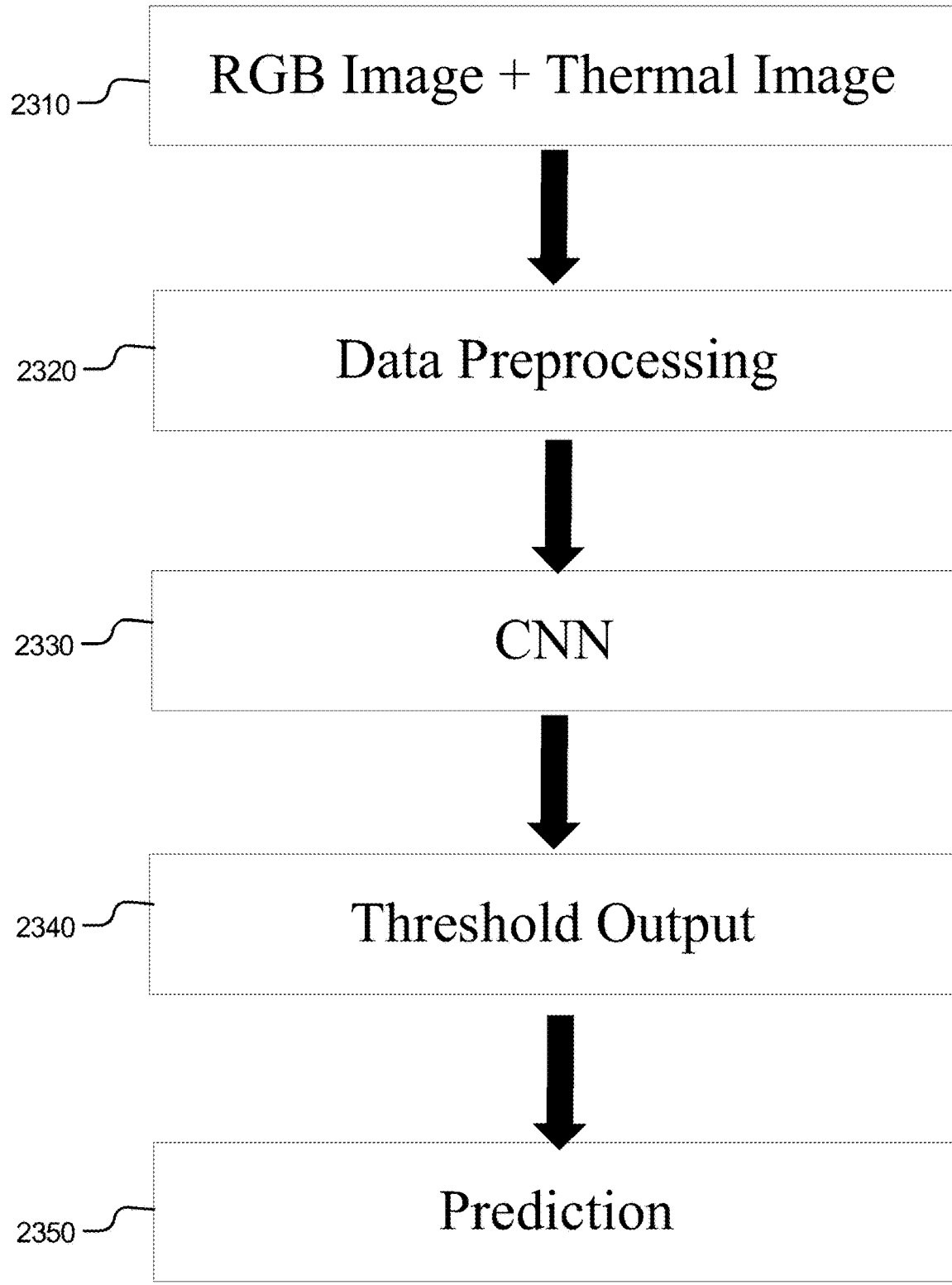
FIG. 23 illustrates an example flow diagram 2300 for over-boil detection with dual sensor.

FIG. 23 illustrates an example flow diagram 2300 for over-boil detection with dual sensor. In particular embodiments, for over-boil prevention and detection, the smart hood apparatus may use sensor data from both the RGB camera 110b and thermal sensor 110a as input to a classification model to predict over-boil events. The process may be similar to the process described in FIG. 17 for over-boil detection except the input may be now a combined RGB image and thermal image 2310. The data preprocessing 2320 may combine information from both sensors to form a single input to the classification model, e.g., CNN 2330. A threshold output 2340 for the category with the highest confidence level may be used for prediction 2350. In particular embodiments, the process of training and deploying the classification model may be similar to the processes illustrated in FIGS. 19A-19B and similar prediction categories and confidence scores may form the output of the classification model.

Figure 24:
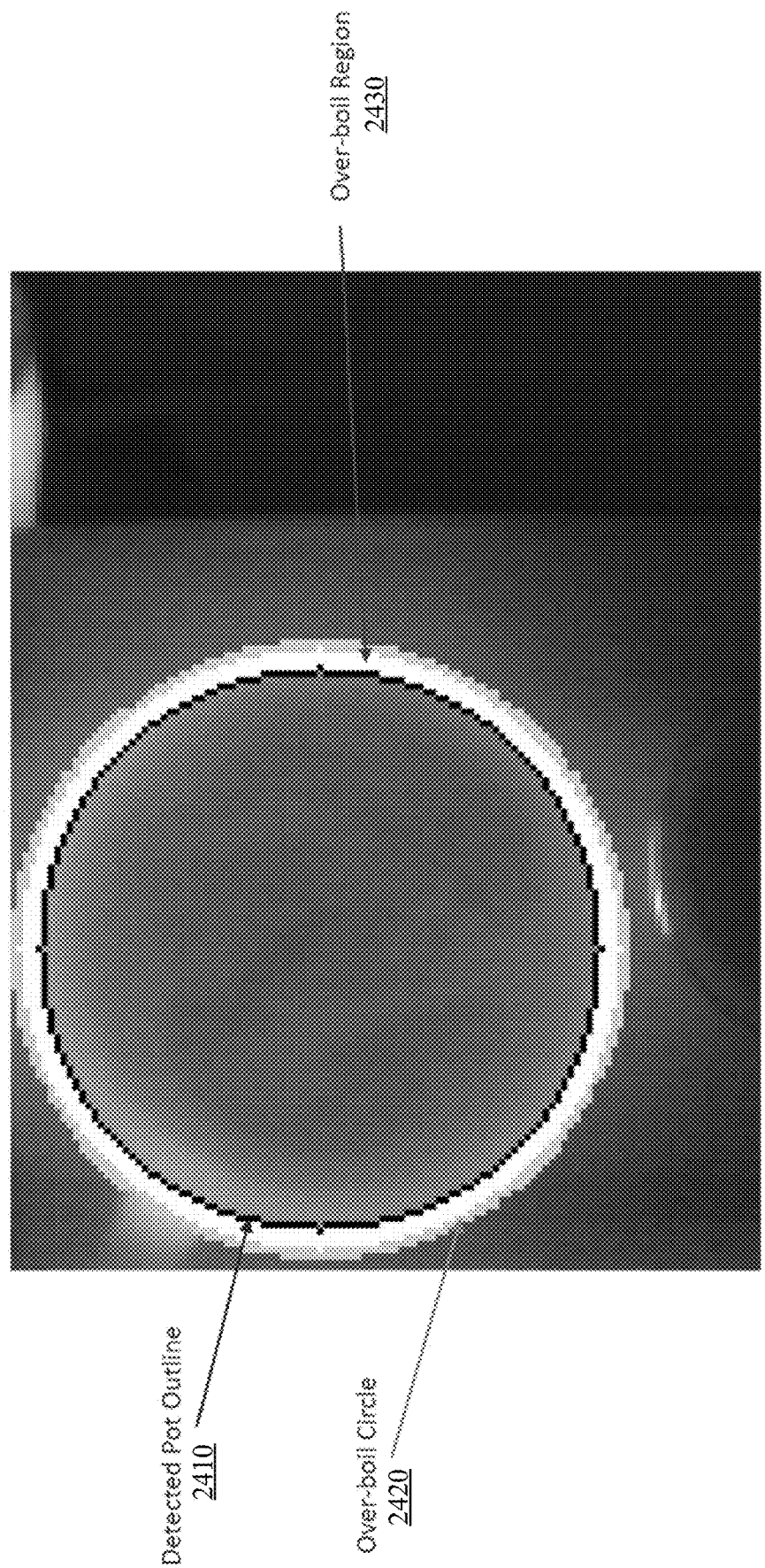
FIG. 24 illustrates an example over-boil region determined based on thermal imaging.

FIG. 24 illustrates an example over-boil region determined based on thermal imaging. In particular embodiments, the smart hood apparatus may detect over-boil with a thermal imaging unit 110a. That is, to define an over-boil region around the outside of the pot and monitor the pixel values for significant changes in comparison to the steady state values. The image in FIG. 24 shows the thermal imaging representation of this concept. As may be seen, the thermal imaging representation may show the detected pot outline 2410, the over-boil circle 2420, and the over-boil region 2430.

Figure 25:
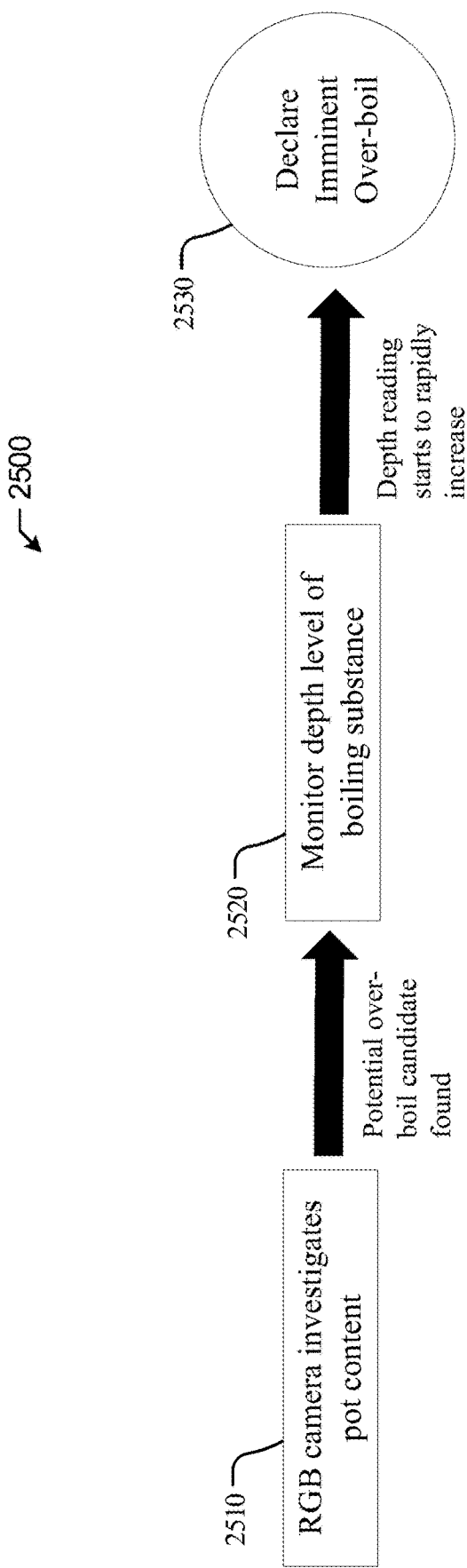
FIG. 25 illustrates an example flow diagram for over-boil prevention using dual sensor.

In particular embodiments, for over-boil prevention, the smart hood apparatus may employ a dual sensor approach as demonstrated in FIG. 13. The dual sensor may comprise a RGB camera 110b and a depth sensor 110d. The RGB camera 110b may give the main indication of a boiling candidate while the depth sensor 110d may provide a depth reading corresponding to the surface of the potential over-boil candidate. FIG. 25 illustrates an example flow diagram 2500 for over-boil prevention using dual sensor. At step 2510, the RGB camera may investigate pot content. After the potential over-boil candidate is found, at step 2520, the smart hood apparatus may monitor the depth level of the boiling substance from the depth sensor 110d. If the depth reading starts to rapidly increase, the smart hood apparatus may declare imminent over-boil at step 2530.

Figure 26:
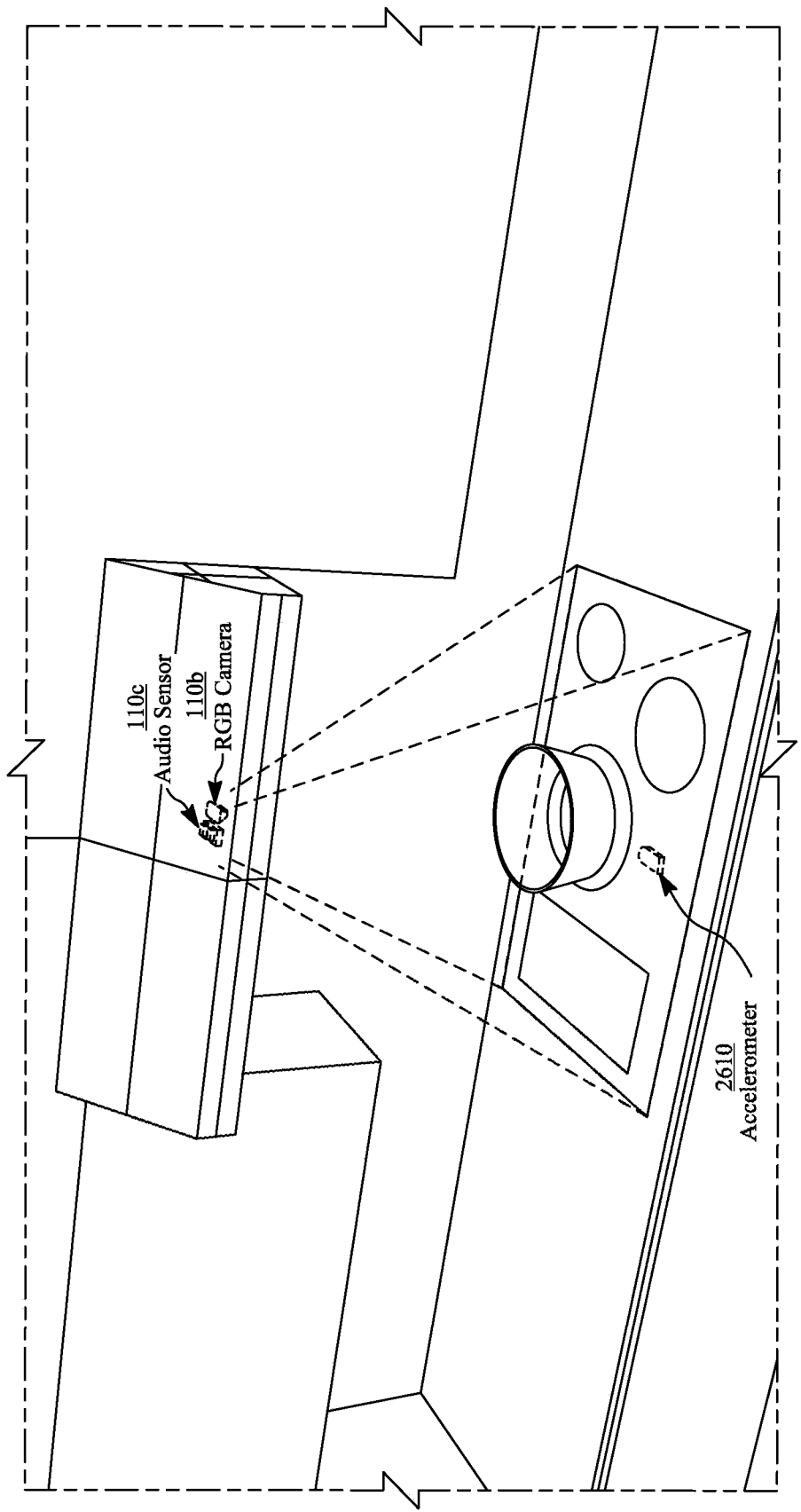
FIG. 26 illustrates an example setup of an audio sensor and an accelerometer.

FIG. 26 illustrates an example setup of an audio sensor and an accelerometer. As discussed for previously, it may be possible to extract many features from either an audio signal captured by an audio sensor 110c or a vibration signal measured by an accelerometer 2610. The setup shown in FIG. 26 may also be used to detect signal features corresponding to imminent over-boil or active over-boil events. Similar to boiling detection, the process of over-boiling may be intuitively detected by humans, which may signify that there are features present that may be used to detect over-boil algorithmically. Again, features may be extracted from the frequency domain representation of the audio signal using windowing. The same frequency-domain features used for boiling detection (e.g., those listed in Table 1) may be used for over-boil prevention. In particular embodiments, there may be different approaches to process these signals. One approach may be a deterministic approach, which looks for specific patterns in certain features. Another approach may be to feed all the features into a deep-learning model and train the over-boil prevention model using datasets of several cooking utensils, cooktops/stovetops, and over-boil substance combinations.

Figure 27A:
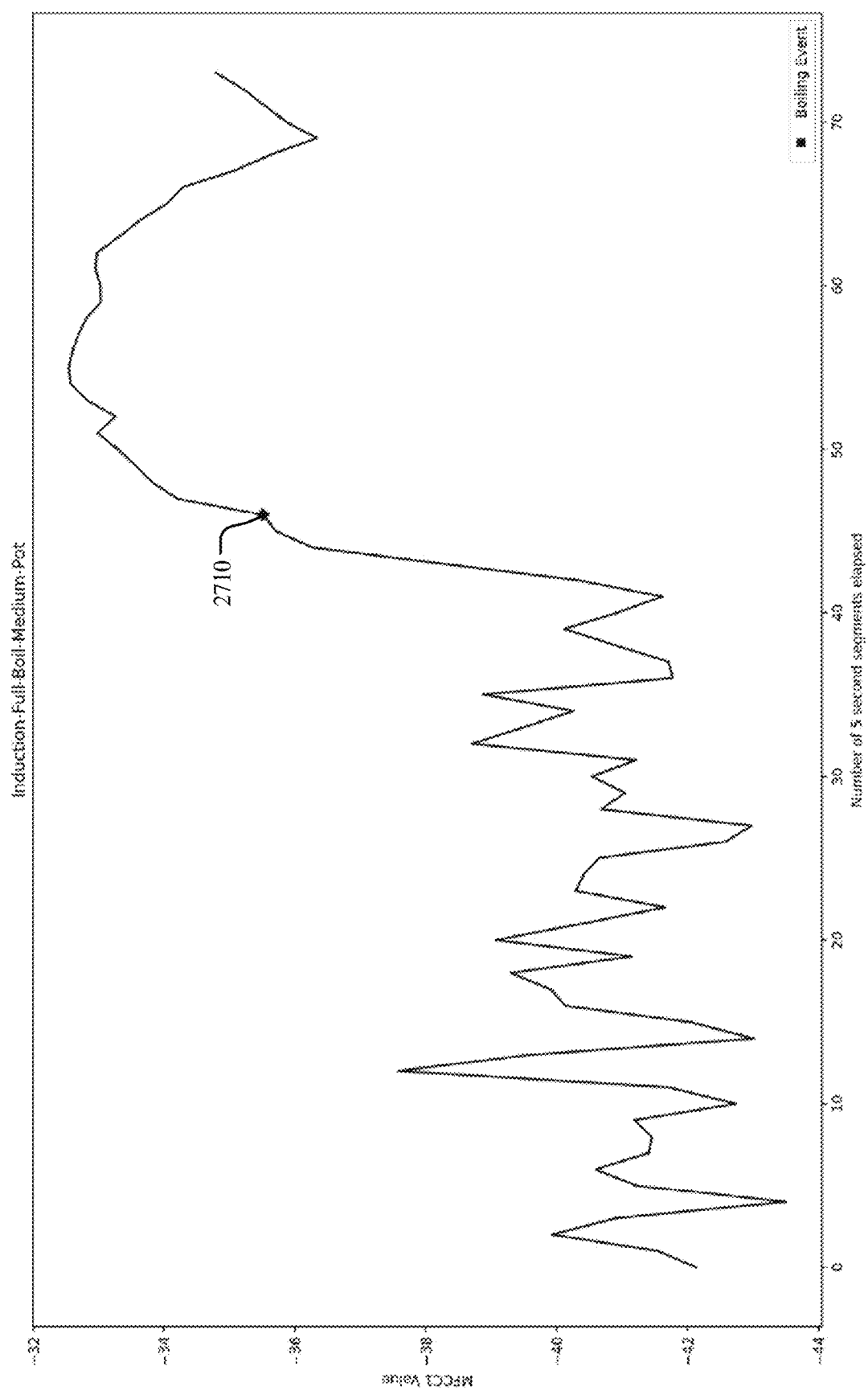
FIGS. 27A-27B illustrate example experimental results for boil time estimation.
Figure 27B:
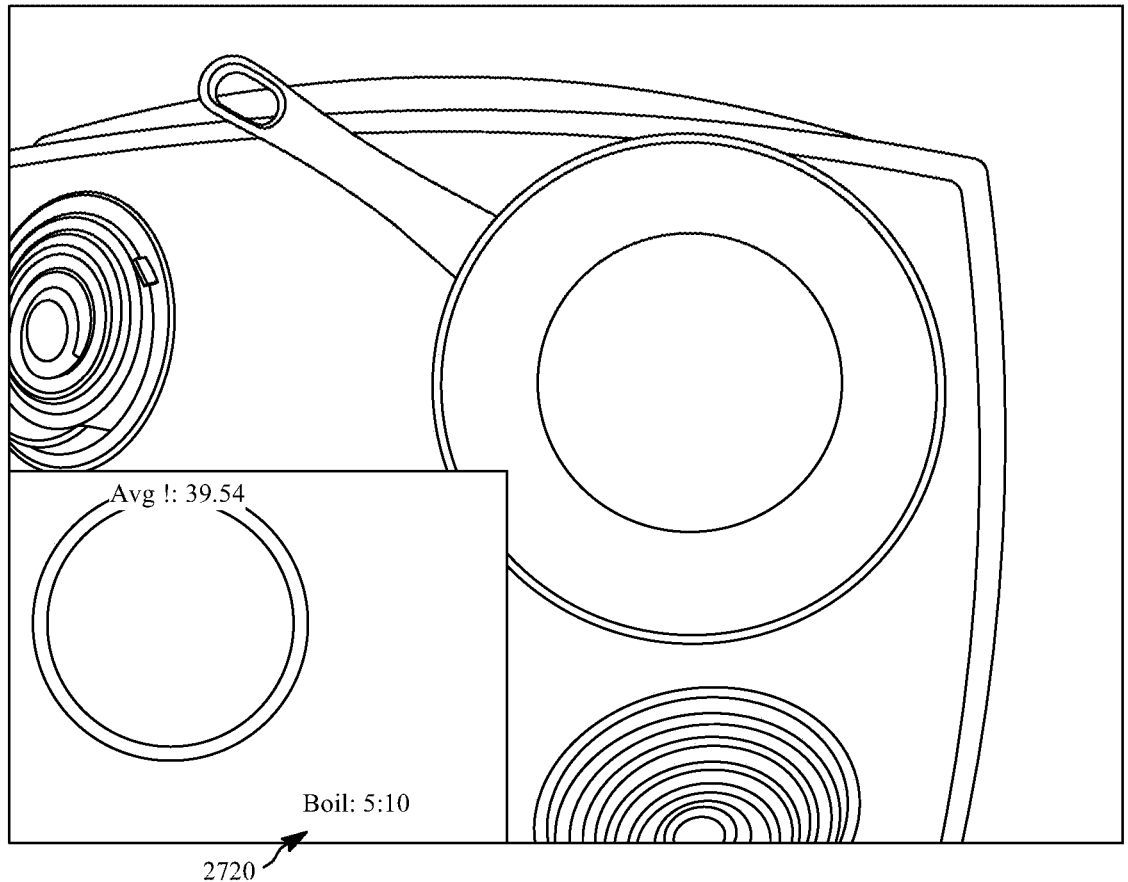

FIGS. 27A-27B illustrate example experimental results for boil time estimation. As demonstrated in FIGS. 27A-27B, the experiments have shown that the smart hood apparatus has consistently estimated the boiling time for various pots of water within approximate 10-second accuracy. This level of fidelity may be sufficient for most cooking tasks. In terms of detecting the final boil event, consistent results have been achieved on a multitude of different pots and cooktops/stovetops using the combination of RGB camera analysis along with audio signal processing for the lid-on case. FIG. 27A illustrates example experimental results for boil time estimation using audio features. The boiling event 2710 may be determined based on the audio features with respect to the time elapsed. FIG. 27B illustrates example experimental results for boil time estimation using RGB camera and thermal imaging unit. As may be seen, the smart hood apparatus may output the estimated time boil 2720 (e.g., 5:10).

FIG. 28 illustrates example detection results of over-boil with confidence scores. Using the over-boil detection model obtained from the generated dataset, the smart hood apparatus may be able to predict over-boil, boil, and non-boil events with high confidence. From the images in FIG. 28, we may see for each scenario the predicted class and the corresponding confidence score associated with the prediction. For example, the first image shows the prediction of over-boil with a confidence score of 0.77, the second image shows the prediction of boil with a confidence score of 0.90, and the third image shows the prediction of non-boil with a confidence score of 0.86. These results may be considered consistent with human judgement by observing the content in the pot.

In particular embodiments, the smart hood apparatus may be applied to a plurality of use cases. One example use case may be in the consumer kitchen. The low-cost and universal retrofit capabilities of the smart hood apparatus may allow it to be easily installed on any existing range hood. The addition of the smart hood apparatus may improve the cooking experience regardless of the skill level of the user. Many cooking processes require boiling of a liquid as a step, and by providing a time estimation of boiling, the smart hood apparatus may allow the user to perform other tasks while their contents are being heat up to a boil. Furthermore, the alert that the boiling has commenced may allow the user to begin the next step in the cooking process immediately, avoiding situations where the contents have been boiling for too long and a significant portion is lost to evaporation. In terms of over-boil, the smart hood apparatus may eliminate the unpleasant situation of spillage occurring on the cooktop/stovetop due to the contents of the pot spilling over. This may be a hassle to clean and may be very frustrating for the user. Anticipatory action prompted by the smart hood apparatus may turn down the heat before any issues occur. Moreover, if for whatever reason over-boil still happens, the detection aspect of the smart hood apparatus may immediately take actions to turn down the heat even more to prevent any further spillage.

Another example use case may be to apply the smart hood apparatus to different mediums that require boiling estimation and detection as well as overboil prevention and detection. This may include industrial boiling tanks, microwaves, commercial kitchens, and nuclear boiling water reactors. The smart hood apparatus in each case may be mounted on the ceiling of the container and similar functionality may be achieved via slight modifications to the respective models.

FIG. 29 illustrates is a flow diagram of a method for monitoring for boiling fluid in a kitchen environment, in accordance with the presently disclosed embodiments. The method 2900 may be performed utilizing one or more processing devices (e.g., the smart hood apparatus) that may include hardware (e.g., a sensor, a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing sensor data, software (e.g., instructions running/executing on one or more processors), firmware (e.g., microcode), or some combination thereof.

The method 2900 may begin at step 2910 with the one or more processing devices (e.g., the smart hood apparatus). For example, in particular embodiments, the smart hood apparatus may access, from one or more sensors 110 associated with the smart hood apparatus, sensor data indicating one or more parameters of a cooking utensil detected by the smart hood apparatus, wherein the one or more sensors 110 comprise one or more of a camera, a thermal sensor, or an audio sensor, wherein the cooking utensil contains fluid, wherein the smart hood apparatus is integrated in a kitchen hood in a kitchen environment, wherein the kitchen hood is positioned over a cooktop, wherein the cooking utensil is placed on the cooktop, and wherein the one or more parameters of the cooking utensil comprise one or more of a material of the cooking utensil, a position of the cooking utensil on the cooktop, a temperature of the cooking utensil, a size of the cooking utensil, a volume of the cooking utensil, an area of the cooking utensil occupying the cooktop, a depth of the cooking utensil, a depth of the fluid in the cooking utensil, a type of the fluid in the cooking utensil, a decibel associated with the cooking utensil, or a lid associated with the cooking utensil. The method 2900 may then continue at step 2920 with the one or more processing devices (e.g., the smart hood apparatus). For example, in particular embodiments, the smart hood apparatus may determine, based on the sensor data by one or more algorithms, information associated with one or more boiling events associated with the fluid in the cooking utensil, wherein the information comprises at least a boiling time required for the fluid to boil1, wherein determining the information associated with the one or more boiling events comprises determining a mean temperature of the fluid in the cooking utensil, wherein the information associated with the one or more boiling events is based on the mean temperature, wherein the one or more boiling events comprise one or more of a non-boil, an imminent boil, an active boil, an imminent over-boil, or an active over-boil of the fluid in the cooking utensil, wherein determining the information associated with the one or more boiling events when the one or more boiling events comprise at least an active boil of the fluid in the cooking utensil comprises detecting bubble circles in the fluid in the cooking utensil, determining a number of bubble circles per surface area of the fluid in the cooking utensil is greater than a threshold number, and determining the fluid in the cooking utensil is in an active boil responsive to determining the number of bubble circles per surface area of the fluid in the cooking utensil is greater than the threshold number, and wherein determining the information associated with the one or more boiling events when the one or more boiling events comprise at least an active over-boil of the fluid in the cooking utensil comprises detecting a utensil outline of the cooking utensil, determining an over-boil region associated with the cooking utensil based on the utensil outline, detecting the fluid appearing in the over-boil region associated with the cooking utensil, and determining the fluid in the cooking utensil is in an active over-boil based on the detection of the fluid appearing in the over-boil region. The method 2900 may then continue at step 2930 with the one or more processing devices (e.g., the smart hood apparatus). For example, in particular embodiments, the smart hood apparatus may send instructions for presenting a notification comprising the information associated with the one or more boiling events. Particular embodiments may repeat one or more steps of the method of FIG. 29, where appropriate. Although this disclosure describes and illustrates particular steps of the method of FIG. 29 as occurring in a particular order, this disclosure contemplates any suitable steps of the method of FIG. 29 occurring in any suitable order. Moreover, although this disclosure describes and illustrates an example method for monitoring for boiling fluid in a kitchen environment including the particular steps of the method of FIG. 29, this disclosure contemplates any suitable method for monitoring for boiling fluid in a kitchen environment including any suitable steps, which may include all, some, or none of the steps of the method of FIG. 29, where appropriate. Furthermore, although this disclosure describes and illustrates particular components, devices, or systems carrying out particular steps of the method of FIG. 29, this disclosure contemplates any suitable combination of any suitable components, devices, or systems carrying out any suitable steps of the method of FIG. 29.

Systems and Methods

Figure 30:
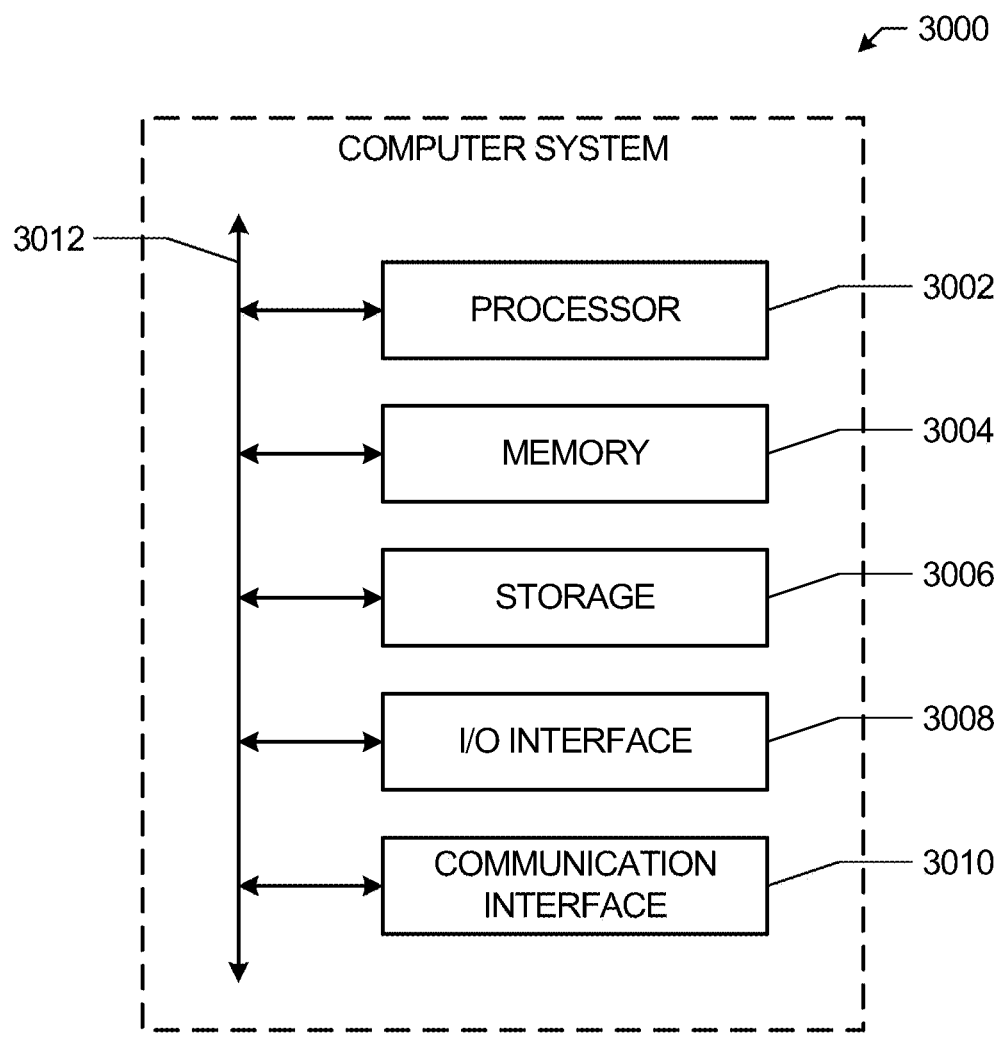
FIG. 30 illustrates an example computer system.

FIG. 30 illustrates an example computer system 3000 that may be utilized to perform monitoring for boiling fluid in a kitchen environment, in accordance with the presently disclosed embodiments. In particular embodiments, one or more computer systems 3000 perform one or more steps of one or more methods described or illustrated herein. In particular embodiments, one or more computer systems 3000 provide functionality described or illustrated herein. In particular embodiments, software running on one or more computer systems 3000 performs one or more steps of one or more methods described or illustrated herein or provides functionality described or illustrated herein. Particular embodiments include one or more portions of one or more computer systems 3000. Herein, reference to a computer system may encompass a computing device, and vice versa, where appropriate. Moreover, reference to a computer system may encompass one or more computer systems, where appropriate.

This disclosure contemplates any suitable number of computer systems 3000. This disclosure contemplates computer system 3000 taking any suitable physical form. As example and not by way of limitation, computer system 3000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 3000 may include one or more computer systems 3000; be unitary or distributed; span multiple locations; span multiple machines; span multiple data centers; or reside in a cloud, which may include one or more cloud components in one or more networks.

Where appropriate, one or more computer systems 3000 may perform without substantial spatial or temporal limitation one or more steps of one or more methods described or illustrated herein. As an example, and not by way of limitation, one or more computer systems 3000 may perform in real time or in batch mode one or more steps of one or more methods described or illustrated herein. One or more computer systems 3000 may perform at different times or at different locations one or more steps of one or more methods described or illustrated herein, where appropriate.

In particular embodiments, computer system 3000 includes a processor 3002, memory 3004, storage 3006, an input/output (I/O) interface 3008, a communication interface 3010, and a bus 3012. Although this disclosure describes and illustrates a particular computer system having a particular number of particular components in a particular arrangement, this disclosure contemplates any suitable computer system having any suitable number of any suitable components in any suitable arrangement. In particular embodiments, processor 3002 includes hardware for executing instructions, such as those making up a computer program. As an example, and not by way of limitation, to execute instructions, processor 3002 may retrieve (or fetch) the instructions from an internal register, an internal cache, memory 3004, or storage 3006; decode and execute them; and then write one or more results to an internal register, an internal cache, memory 3004, or storage 3006. In particular embodiments, processor 3002 may include one or more internal caches for data, instructions, or addresses. This disclosure contemplates processor 3002 including any suitable number of any suitable internal caches, where appropriate. As an example, and not by way of limitation, processor 3002 may include one or more instruction caches, one or more data caches, and one or more translation lookaside buffers (TLBs). Instructions in the instruction caches may be copies of instructions in memory 3004 or storage 3006, and the instruction caches may speed up retrieval of those instructions by processor 3002.

Data in the data caches may be copies of data in memory 3004 or storage 3006 for instructions executing at processor 3002 to operate on; the results of previous instructions executed at processor 3002 for access by subsequent instructions executing at processor 3002 or for writing to memory 3004 or storage 3006; or other suitable data. The data caches may speed up read or write operations by processor 3002. The TLBs may speed up virtual-address translation for processor 3002. In particular embodiments, processor 3002 may include one or more internal registers for data, instructions, or addresses. This disclosure contemplates processor 3002 including any suitable number of any suitable internal registers, where appropriate. Where appropriate, processor 3002 may include one or more arithmetic logic units (ALUs); be a multi-core processor; or include one or more processors 3002. Although this disclosure describes and illustrates a particular processor, this disclosure contemplates any suitable processor.

In particular embodiments, memory 3004 includes main memory for storing instructions for processor 3002 to execute or data for processor 3002 to operate on. As an example, and not by way of limitation, computer system 3000 may load instructions from storage 3006 or another source (such as, for example, another computer system 3000) to memory 3004. Processor 3002 may then load the instructions from memory 3004 to an internal register or internal cache. To execute the instructions, processor 3002 may retrieve the instructions from the internal register or internal cache and decode them. During or after execution of the instructions, processor 3002 may write one or more results (which may be intermediate or final results) to the internal register or internal cache. Processor 3002 may then write one or more of those results to memory 3004. In particular embodiments, processor 3002 executes only instructions in one or more internal registers or internal caches or in memory 3004 (as opposed to storage 3006 or elsewhere) and operates only on data in one or more internal registers or internal caches or in memory 3004 (as opposed to storage 3006 or elsewhere).

One or more memory buses (which may each include an address bus and a data bus) may couple processor 3002 to memory 3004. Bus 3012 may include one or more memory buses, as described below. In particular embodiments, one or more memory management units (MMUs) reside between processor 3002 and memory 3004 and facilitate accesses to memory 3004 requested by processor 3002. In particular embodiments, memory 3004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 3004 may include one or more memory devices 3004, where appropriate. Although this disclosure describes and illustrates particular memory, this disclosure contemplates any suitable memory.

In particular embodiments, storage 3006 includes mass storage for data or instructions. As an example, and not by way of limitation, storage 3006 may include a hard disk drive (HDD), a floppy disk drive, flash memory, an optical disc, a magneto-optical disc, magnetic tape, or a Universal Serial Bus (USB) drive or a combination of two or more of these. Storage 3006 may include removable or non-removable (or fixed) media, where appropriate. Storage 3006 may be internal or external to computer system 3000, where appropriate. In particular embodiments, storage 3006 is non-volatile, solid-state memory. In particular embodiments, storage 3006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 3006 taking any suitable physical form. Storage 3006 may include one or more storage control units facilitating communication between processor 3002 and storage 3006, where appropriate. Where appropriate, storage 3006 may include one or more storages 3006. Although this disclosure describes and illustrates particular storage, this disclosure contemplates any suitable storage.

In particular embodiments, I/O interface 3008 includes hardware, software, or both, providing one or more interfaces for communication between computer system 3000 and one or more I/O devices. Computer system 3000 may include one or more of these I/O devices, where appropriate. One or more of these I/O devices may enable communication between a person and computer system 3000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 3006 for them. Where appropriate, I/O interface 3008 may include one or more device or software drivers enabling processor 3002 to drive one or more of these I/O devices. I/O interface 3008 may include one or more I/O interfaces 3006, where appropriate. Although this disclosure describes and illustrates a particular I/O interface, this disclosure contemplates any suitable I/O interface.

In particular embodiments, communication interface 3010 includes hardware, software, or both providing one or more interfaces for communication (such as, for example, packet-based communication) between computer system 3000 and one or more other computer systems 3000 or one or more networks. As an example, and not by way of limitation, communication interface 3010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3010 for it. As an example, and not by way of limitation, computer system 3000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 3000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 3000 may include any suitable communication interface 3010 for any of these networks, where appropriate. Communication interface 3010 may include one or more communication interfaces 3010, where appropriate. Although this disclosure describes and illustrates a particular communication interface, this disclosure contemplates any suitable communication interface.

In particular embodiments, bus 3012 includes hardware, software, or both coupling components of computer system 3000 to each other. As an example, and not by way of limitation, bus 3012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3012 may include one or more buses 3012, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for monitoring for boiling fluid in a kitchen environment comprising:
    accessing, from one or more sensors associated with a smart hood apparatus, sensor data indicating one or more parameters of a cooking utensil detected by the smart hood apparatus, wherein the one or more sensors comprise one or more of a camera or a thermal sensor, and wherein the cooking utensil contains a fluid;
    determining, by the smart hood and based on measurements by the smart hood's thermal sensor, a temperature of the fluid in the cooking utensil;
    selecting, by the smart hood and based on a comparison of the determined temperature of the fluid in the cooking utensil to one or more predetermined threshold temperatures that are less than a boiling temperature, one or more particular sensors associated with the smart hood apparatus and one or more particular boiling-event algorithms from a plurality of predetermined boiling event algorithms for detecting one or more boiling events associated with the fluid, wherein the one or more boiling events comprise a start time of a boiling of the fluid;
    determining, by the smart hood, based on sensor data from the selected one or more particular sensors and based on the selected one or more particular boiling-event algorithms, information associated with one or more boiling events associated with the fluid in the cooking utensil, wherein the information comprises at least a boiling time required for the fluid to boil; and
    providing, for presentation to a user, a notification comprising at least some of the information associated with the one or more boiling events.

2. The method of claim 1, wherein determining the temperature of the fluid in the cooking utensil comprises determining a mean temperature of the fluid in the cooking utensil.

3. The method of claim 1, wherein the one or more boiling events further comprise at least an active boil of the fluid in the cooking utensil, wherein determining the information associated with the one or more boiling events comprises:
    detecting bubble circles in the fluid in the cooking utensil;
    determining a number of bubble circles per surface area of the fluid in the cooking utensil is greater than a threshold number; and
    determining the fluid in the cooking utensil is in an active boil responsive to determining the number of bubble circles per surface area of the fluid in the cooking utensil is greater than the threshold number.

4. The method of claim 1, wherein the one or more boiling events further comprise at least an active over-boil of the fluid in the cooking utensil, wherein determining the information associated with the one or more boiling events comprises:
- detecting a utensil outline of the cooking utensil;
- determining an over-boil region associated with the cooking utensil based on the utensil outline;
- detecting the fluid appearing in the over-boil region associated with the cooking utensil; and
- determining the fluid in the cooking utensil is in an active over-boil based on the detection of the fluid appearing in the over-boil region.

5. The method of claim 1, wherein the one or more boiling events further comprise one or more of a non-boil, an imminent boil, an active boil, an imminent over-boil, or an active over-boil of the fluid in the cooking utensil.

6. The method of claim 1, wherein the one or more parameters of the cooking utensil comprise one or more of:
- a material of the cooking utensil;
- a position of the cooking utensil on a cooktop;
- a temperature of the cooking utensil;
- a size of the cooking utensil;
- a volume of the cooking utensil;
- an area of the cooking utensil occupying the cooktop;
- a depth of the cooking utensil;
- a depth of the fluid in the cooking utensil;
- a type of the fluid in the cooking utensil;
- a decibel associated with the cooking utensil; or
- a lid associated with the cooking utensil.

7. The method of claim 1, wherein the smart hood apparatus is integrated in a kitchen hood in the kitchen environment, wherein the kitchen hood is positioned over a cooktop, and wherein the cooking utensil is placed on the cooktop.

8. A smart hood apparatus comprising:
- one or more displays;
- one or more sensors;
- one or more non-transitory computer-readable storage media including instructions for boiling fluid in a kitchen environment by the smart hood apparatus; and
- one or more processors coupled to the storage media, the one or more processors configured to execute the instructions to:
  - access, from one or more sensors associated with the smart hood apparatus, sensor data indicating one or more parameters of a cooking utensil detected by the smart hood apparatus, wherein the one or more sensors comprise one or more of a camera sensor or a thermal sensor, and wherein the cooking utensil contains a fluid;
  - determine, based measurements by the thermal sensor, a temperature of the fluid in the cooking utensil;
  - select, based on a comparison of the determined temperature of the fluid in the cooking utensil to one or more predetermined threshold temperatures that are less than a boiling temperature, one or more particular sensors associated with the smart hood apparatus and one or more particular boiling-event algorithms from a plurality of predetermined boiling event algorithms for detecting one or more boiling events associated with the fluid, wherein the one or more boiling events comprise a start time of a boiling of the fluid;
  - determine, based on sensor data from the selected at least one sensor and based on the selected one or more particular boiling-event algorithms, information associated with one or more boiling events associated with the fluid in the cooking utensil, wherein the information comprises at least a boiling time required for the fluid to boil; and
  - provide, for presentation to a user, a notification comprising at least some of the information associated with the one or more boiling events.

9. The smart hood apparatus of claim 8, wherein determining the temperature of the fluid in the cooking utensil comprises determining a mean temperature of the fluid in the cooking utensil.

10. The smart hood apparatus of claim 8, wherein the one or more boiling events further comprise at least an active boil of the fluid in the cooking utensil, wherein determining the information associated with the one or more boiling events comprises:
- detecting bubble circles in the fluid in the cooking utensil;
- determining a number of bubble circles per surface area of the fluid in the cooking utensil is greater than a threshold number; and
- determining the fluid in the cooking utensil is in an active boil responsive to determining the number of bubble circles per surface area of the fluid in the cooking utensil is greater than the threshold number.

11. The smart hood apparatus of claim 8, wherein the one or more boiling events further comprise at least an active over-boil of the fluid in the cooking utensil, wherein determining the information associated with the one or more boiling events comprises:
- detecting a utensil outline of the cooking utensil;
- determining an over-boil region associated with the cooking utensil based on the utensil outline;
- detecting the fluid appearing in the over-boil region associated with the cooking utensil; and
- determining the fluid in the cooking utensil is in an active over-boil based on the detection of the fluid appearing in the over-boil region.

12. The smart hood apparatus of claim 8, wherein the one or more boiling events further comprise one or more of a non-boil, an imminent boil, an active boil, an imminent over-boil, or an active over-boil of the fluid in the cooking utensil.

13. The smart hood apparatus of claim 8, wherein the one or more parameters of the cooking utensil comprise one or more of:
- a material of the cooking utensil;
- a position of the cooking utensil on a cooktop;
- a temperature of the cooking utensil;
- a size of the cooking utensil;
- a volume of the cooking utensil;
- an area of the cooking utensil occupying the cooktop;
- a depth of the cooking utensil;
- a depth of the fluid in the cooking utensil;
- a type of the fluid in the cooking utensil;
- a decibel associated with the cooking utensil; or
- a lid associated with the cooking utensil.

14. The smart hood apparatus of claim 8, wherein the smart hood apparatus is integrated in a kitchen hood in the kitchen environment, wherein the kitchen hood is positioned over a cooktop, and wherein the cooking utensil is placed on the cooktop.

15. A computer-readable non-transitory storage media comprising instructions for boiling fluid in a kitchen environment by a smart hood apparatus, the instructions being executable by a processor to:
- access, from one or more sensors associated with the smart hood apparatus, sensor data indicating one or more parameters of a cooking utensil detected by the smart hood apparatus, wherein the one or more sensors comprise one or more of a camera sensor or a thermal sensor and wherein the cooking utensil contains a fluid;

determine, by the smart hood and based on measurements by the smart hood's thermal sensor, a temperature of the fluid in the cooking utensil;

select, by the smart hood and based on a comparison of the determined temperature of the fluid in the cooking utensil to one or more predetermined threshold temperatures that are less than a boiling temperature, one or more particular sensors associated with the smart hood apparatus and one or more particular boiling-event algorithms from a plurality of predetermined boiling event algorithms for detecting one or more boiling events associated with the fluid, wherein the one or more boiling events comprise a start time of a boiling of the fluid;

determine, by the smart hood, based on sensor data from the selected at least one sensor and based on the selected one or more particular boiling-event algorithms, information associated with one or more boiling events associated with the fluid in the cooking utensil, wherein the information comprises at least a boiling time required for the fluid to boil; and provide, for presentation to a user, a notification comprising at least some of the information associated with the one or more boiling events.

16. The media of claim 15, wherein determining the temperature of the fluid in the cooking utensil comprises determining a mean temperature of the fluid in the cooking utensil.

17. The media of claim 15, wherein the one or more boiling events further comprise at least an active boil of the fluid in the cooking utensil, wherein determining the information associated with the one or more boiling events comprises:

detecting bubble circles in the fluid in the cooking utensil;

determining a number of bubble circles per surface area of the fluid in the cooking utensil is greater than a threshold number; and determining the fluid in the cooking utensil is in an active boil responsive to determining the number of bubble circles per surface area of the fluid in the cooking utensil is greater than the threshold number.

18. The media of claim 15, wherein the one or more boiling events further comprise at least an active over-boil of the fluid in the cooking utensil, wherein determining the information associated with the one or more boiling events comprises:

detecting a utensil outline of the cooking utensil;

determining an over-boil region associated with the cooking utensil based on the utensil outline;

detecting the fluid appearing in the over-boil region associated with the cooking utensil; and determining the fluid in the cooking utensil is in an active over-boil based on the detection of the fluid appearing in the over-boil region.

19. The media of claim 15, wherein the one or more boiling events further comprise one or more of a non-boil, an imminent boil, an active boil, an imminent over-boil, or an active over-boil of the fluid in the cooking utensil.

20. The media of claim 15, wherein the one or more parameters of the cooking utensil comprise one or more of:
a material of the cooking utensil;
a position of the cooking utensil on a cooktop;
a temperature of the cooking utensil;
a size of the cooking utensil;
a volume of the cooking utensil;
an area of the cooking utensil occupying the cooktop;
a depth of the cooking utensil;
a depth of the fluid in the cooking utensil;
a type of the fluid in the cooking utensil;
a decibel associated with the cooking utensil; or
a lid associated with the cooking utensil.

* * * * *